(12) United States Patent
Thompson et al.

(10) Patent No.: US 12,313,075 B2
(45) Date of Patent: May 27, 2025

(54) HIGH EFFICIENCY HYDRONIC CIRCULATOR WITH SENSORS

(71) Applicant: TACO, INC., Cranston, RI (US)

(72) Inventors: Steve Thompson, Calgary (CA); David E. Sweet, Old Lyme, CT (US); Vladislav Milchev Stakev, South Easton, MA (US); Robert F. Birkenstock, Jr., Warwick, RI (US); Douglas Bird, Narragansett, RI (US)

(73) Assignee: TACO, INC., Cranston, RI (US)

( * ) Notice: Subject to any disclaimer, the term of this patent is extended or adjusted under 35 U.S.C. 154(b) by 0 days.

(21) Appl. No.: 17/118,556

(22) Filed: Dec. 10, 2020

(65) Prior Publication Data

US 2021/0095676 A1    Apr. 1, 2021

Related U.S. Application Data

(63) Continuation of application No. 14/689,631, filed on Apr. 17, 2015, now abandoned.
(Continued)

(51) Int. Cl.
*F04D 15/00* (2006.01)
*F04D 13/06* (2006.01)
(Continued)

(52) U.S. Cl.
CPC ....... *F04D 15/0066* (2013.01); *F04D 13/064* (2013.01); *F04D 13/0686* (2013.01);
(Continued)

(58) Field of Classification Search
CPC ..... F24H 9/20–2092; F24H 15/00–493; F24D 19/10–1096; F04D 13/06; F04D 13/064; F04D 13/0686; F04D 15/0066; H02K 11/044; H02K 11/05; H02K 11/20; H02K 11/25; H02K 11/30; H02K 11/33; H02K 11/35; F04B 49/065
See application file for complete search history.

(56) References Cited

U.S. PATENT DOCUMENTS 4,573,001 A * 2/1986 Lin ............................ H02P 6/00
                                                        318/695
4,884,743 A * 12/1989 Baehr ................ G05D 23/1919
                                                        165/200

(Continued)

OTHER PUBLICATIONS

Variable Frequency Drive—Carrier corporation, Syracuse New York Oct. 2005 (Year: 2005).*

(Continued)

*Primary Examiner* — Charles G Freay
*Assistant Examiner* — Joseph S. Herrmann
(74) *Attorney, Agent, or Firm* — Loeb & Loeb LLP

(57) ABSTRACT

A highly efficient circulator system is provided, useful for hydronic systems, including both heating and cooling systems. The stand-alone circulator motor is controllable by input from certain sensors, preferably thermal sensors, which provide data enabling the controller of the brushless pump motor to vary its flow output to meet changes in systems loads. The circulator has a ceramic permanent magnet rotor, such as a ferrite, with an electronically, preferably sinusoidally, commutated, electro-magnetic stator controlling the input of electrical power.

8 Claims, 18 Drawing Sheets

Related U.S. Application Data

(60) Provisional application No. 62/115,050, filed on Feb. 11, 2015.

(51) Int. Cl.
*H02K 11/05* (2016.01)
*H02K 11/33* (2016.01)
*F04B 49/06* (2006.01)

(52) U.S. Cl.
CPC ............ *H02K 11/05* (2016.01); *H02K 11/33* (2016.01); *F04B 49/065* (2013.01)

(56) References Cited

U.S. PATENT DOCUMENTS

| | | | | |
|---|---|---|---|---|
| 5,466,995 A * | 11/1995 | Genga | ................ | F04D 15/0022 318/779 |
| 5,839,655 A * | 11/1998 | Iritani | ................ | F24D 19/1012 237/8 R |
| 6,062,485 A * | 5/2000 | Stege | ................ | G05D 23/1931 237/8 R |
| 7,730,935 B1 * | 6/2010 | Bujak, Jr. | ................ | F24F 11/84 236/1 C |
| 9,519,297 B1 * | 12/2016 | Virskus | ................ | F24F 11/30 |
| 10,267,317 B2 * | 4/2019 | Lopes | ................ | F04D 9/003 |
| 2008/0288115 A1 * | 11/2008 | Rusnak | ................ | F04D 15/0066 700/282 |
| 2010/0089339 A1 * | 4/2010 | Krause | ................ | F24D 17/0078 700/275 |
| 2014/0111052 A1 * | 4/2014 | Wu | ................ | H02K 21/14 310/156.55 |
| 2015/0093253 A1 * | 4/2015 | Jensen | ................ | H02H 7/0833 417/14 |

OTHER PUBLICATIONS

Pump ED 101—Variable Frequency 101—Joe Evans Ph. D Jun. 2003 (Year: 2003).*

* cited by examiner

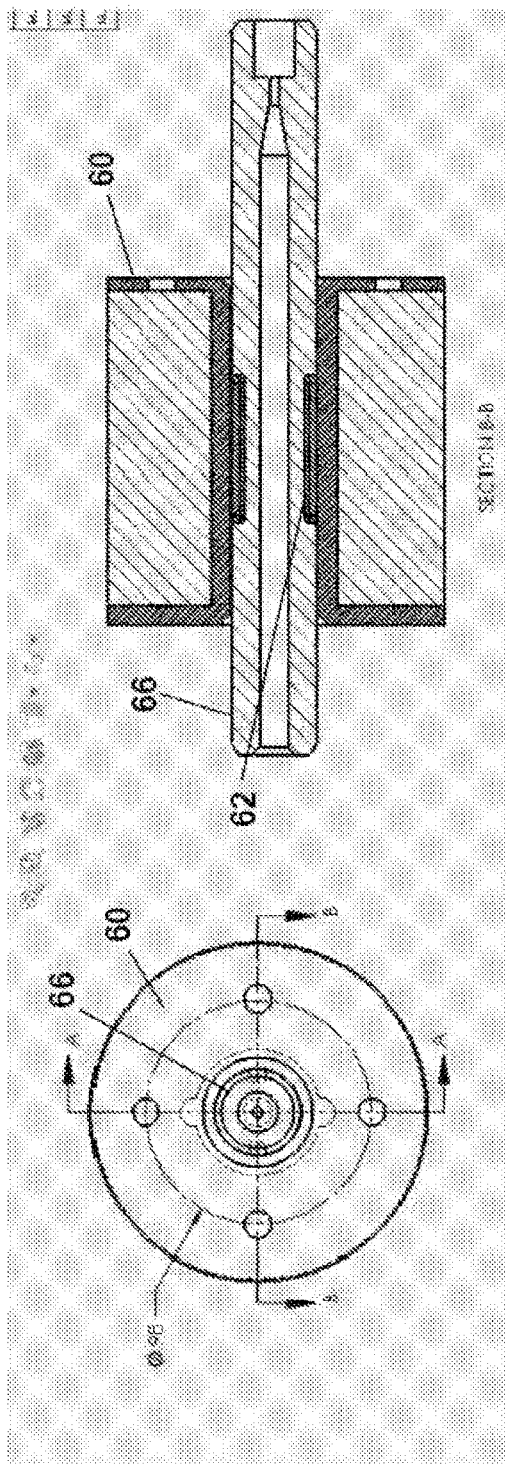
FIG. 6
FIG. 5
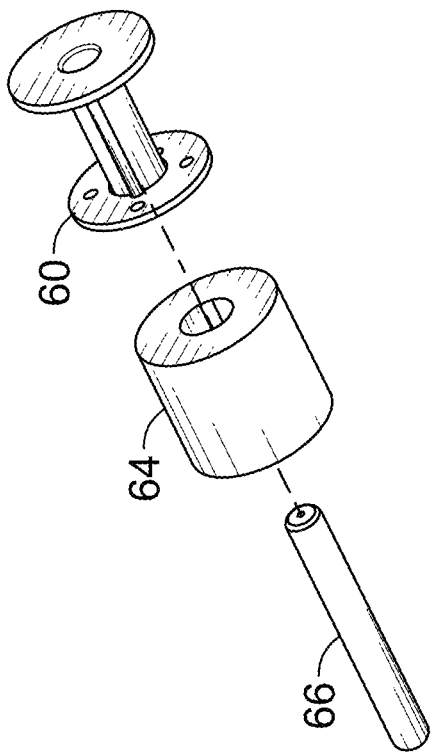
FIG. 7
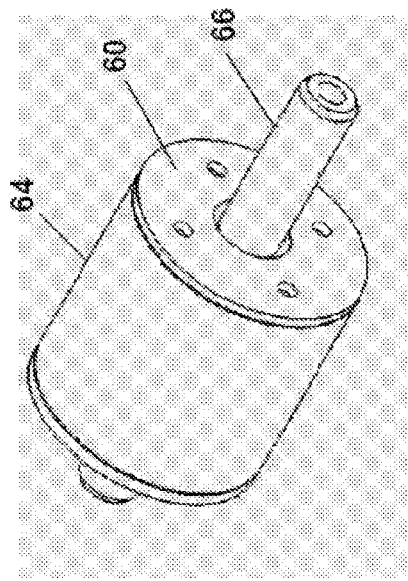
FIG. 4

MOTOR CONTROL BOARD

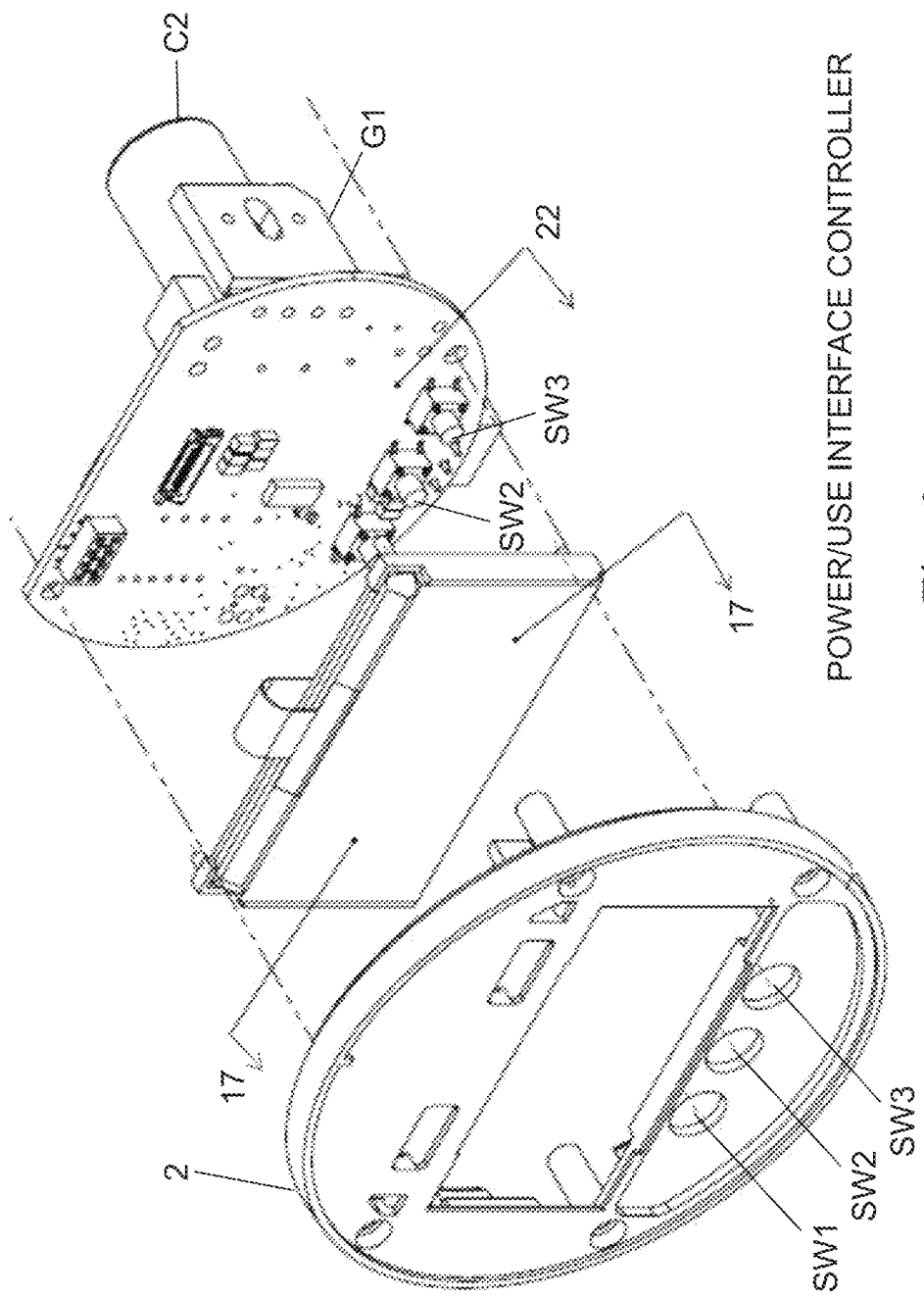

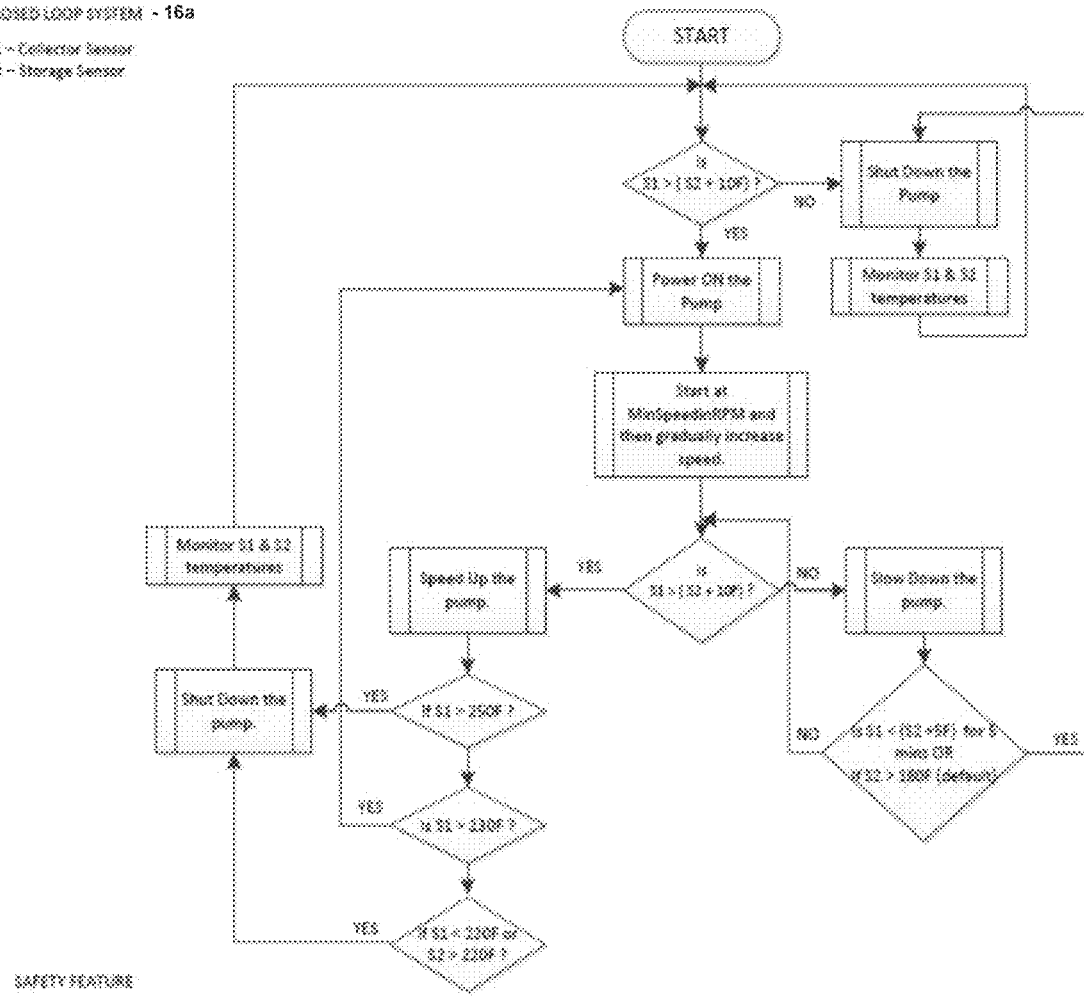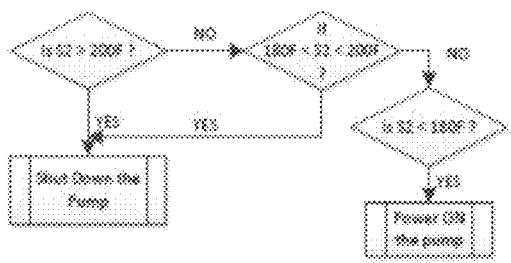
Fig. 10

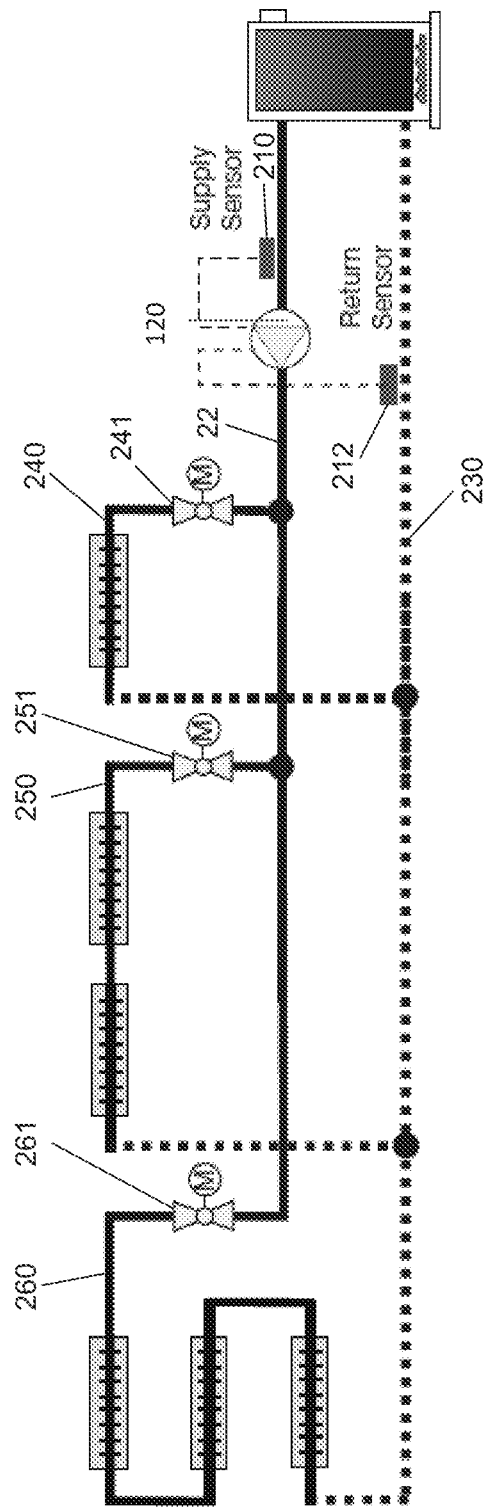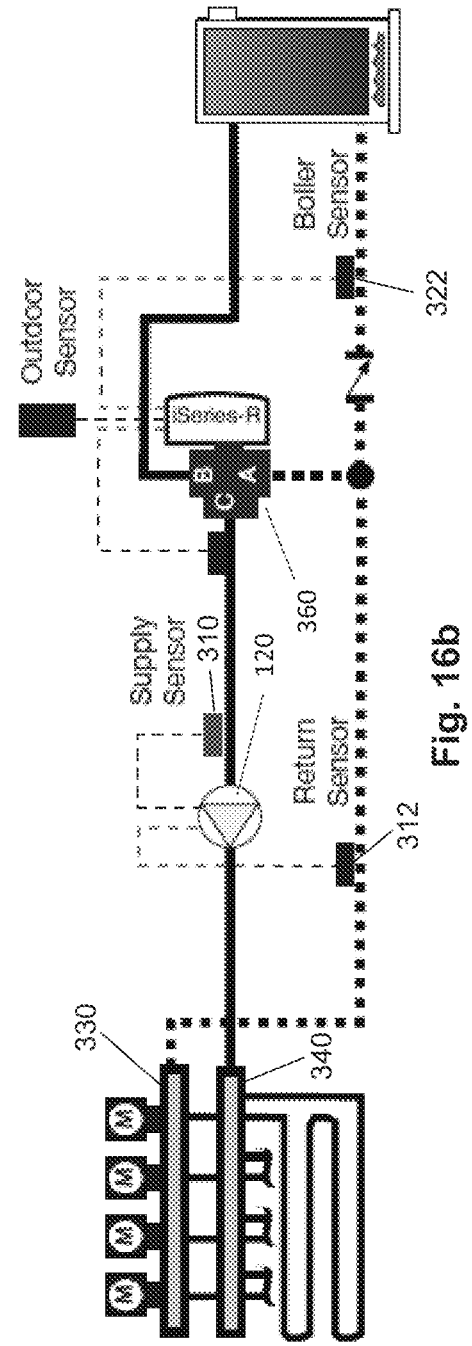
Fig. 16a
Fig. 16b

HIGH EFFICIENCY HYDRONIC CIRCULATOR WITH SENSORS

This application claims the benefit of priority pursuant to 35 U.S.C. 119(e) from a U.S. Provisional Patent Application No. 62/115,050 filed on Feb. 11, 2015, the text of which is fully incorporated by reference herein as if repeated below.

The present invention is directed to a highly efficient circulator system, useful for hydronic systems, including both heating and cooling systems. Specifically, this stand-alone circulator is controllable by input from certain sensors, preferably thermal sensors, which provide data enabling the controller of the brushless pump motor to vary its flow output to meet changes in systems loads. The circulator has a molded, ceramic, such as a ferrite, permanent magnet rotor with an electronically, preferably sinusoidally commutated, electro-magnetic stator controlling the input of electrical power.

BACKGROUND OF THE INVENTION

It has previously been well known to provide a thermal sensor-controlled, electronically commutated, permanent magnet motor, including a wet rotor, for use in hydronic heating systems. One such product has been previously sold by Taco, Inc., under the name Bumble Bee or Model HEC-2, variable speed circulator. That device has a high efficiency DC motor controlled through a programmable PC board by thermal sensors constantly sending data to the printed circuit board ("PCB"). Bumble Bee included a permanent magnet rotor directly connected to the centrifugal impeller of the pump and the pump is of the wet rotor type. The Bumble Bee rotor was formed of a state-of-the-art, compression bonded, rare earth (NdFeB) permanent magnet with an anticorrosion coating, and formed over a low carbon steel back-iron seated on the rotor shaft, which in turn is connected directly to the pump impeller, the stator was powered with a low voltage, e.g., 12 VDC electrical power input controlled by the control board programmed to follow a trapezoidally variable commutation. The use of the rare earth rotor magnet and the use of relatively low input voltage of 12 volts DC, resulted in a motor which, although relatively highly efficient, was costly, utilized a trapezoidal control strategy, and resulted in a motor that was noisier than desirable for residential use.

BRIEF SUMMARY OF THE INVENTION

This invention provides a highly efficient, substantially noise-free, stand-alone wet rotor circulator system for a hydronic heating or cooling system. The circulator system comprising a centrifugal impeller and an electrically powered, rotary motor, controlled by an electronic, variable frequency drive (VFD) control system for controlling the speed of the motor by varying the frequency of the rectified DC current supplied to power the stator coils of the motor. The present electric motor driven, centrifugal circulator system invention goes contrary to the prevailing wisdom of using a small rare earth magnet as the motor rotor and a stepped down trapezoidally varying voltage, e.g., 12 Volts, to drive the motor.

Preferably, in accordance with this invention, the highly efficient, stand-alone circulator system for a hydronic heating or cooling system, is controlled by at least one thermal sensor placed in the flow conduits of the hydronic system, that provides data allowing the pump controller to determine the optimal output flow of the pump under specific temperature differential conditions. Further, preferably, in accordance with this invention, so as to operate at greater efficiencies, while producing less noise and being capable of operating at higher temperatures, a ferrite permanent magnet rotor is used, together with a system of stator coils powered by a non-stepped down, sinusoidally varying DC voltage from a rectified AC power supply, i.e. either a 115-120V AC rectified to about 170 Volts DC or a 230-240V AC, rectified to about 340 Volts DC, and operated by a variable frequency electronic drive ("VFD") system. The VFD system in the preferred embodiment smoothly reacts to changes in system loads, as signaled by the thermal sensors, to determine the pump flow required, with little or no noise and with a minimal use of power. It also avoids the initial cost and maintenance and operating power losses, of a step-down transformer.

The pump is powered by an electronically commutated, permanent magnet rotor motor, with a wet rotor circulator, to deliver the necessary flow for the system. The VFD, which interprets the data received from the thermal sensor or sensors, is integrated into the main motor control electronics and controls the pump operation to maintain the necessary fluid flow rate of the hydronic fluid to meet the heat energy requirement for the system. The thermal sensors measuring the temperature of the heating or cooling fluid at pre-determined points in the system provide the necessary data to operate the VFD to meet demand most efficiently.

Much of the reduced energy usage of these high efficiency circulators, stems from the capability of their VFD's to electronically modulate speed as required to meet demand. The present invention has the additional advantage of relatively low electric current usage, which also reduces the heat developed in the motor, and improves efficiency. The controller presents at least four modes of operation for the circulator, controlled by use of the data from one or more thermal sensors to manage the flow required to meet the thermal demands of the hydronic system: Temperature differential (or Delta T), Temperature Setpoint-Heat, and Temperature Setpoint-Cool, and a drain back system, for protecting the water boiler, during a heating cycle when the hydronic liquid returning to the boiler is too cool. These modes are described below.

Delta T—Measures the temperature differential typically across a zone and adjusts the flow rate to ensure that the hydronic fluid dispenses optimum thermal energy into the room to be heated, to maintain a substantially constant, comfortable temperature. Typical prior installations are often over circulated, where the flowing fluid return temperature is not significantly lower than the supply temperature. This results in wasted energy by the circulator operating at excessive fluid velocity, resulting in excessive noise and poor efficiency of the boiler and overall system. The Delta T mode prevents this over circulation by ensuring a fixed temperature differential from Supply to Return. A prior art high efficiency, proportional pressure pump does not reduce flow based on the thermal demand of the system and would need to be sized similarly to a single speed pump sold today.

Temperature Setpoint Heat—This mode is for the circulator to be used most commonly as an injection pump to a radiant floor system. The pump will add heat to the recirculating loop in the floor to maintain a constant floor temperature using a target value and one sensor in a PI (Proportional Integrated) controller. This circulator is powered when the thermostat for the loop is calling, but will reduce power, speed and flow when the thermal needs of the system are met. There is also an option for the circulator to enter a standby state so as to prevent adding too much heat to the system, or to prevent a shock to the boiler when there is cold water in the flow system returning to the boiler. This is possible, however, because the sinusoidal control system, unlike the trapezoidal system, can reduce noise and achieve a quieter motor. Further, the thermal sensors also provide for a boiler protection feature to prevent thermal shock when starting up a cold system to heat a venue, by initially reducing the amount of hot water injected into the system so as to limit the amount of redirected cold water to the boiler return. An additional application allows the circulator to pump hot water into a fan coil system for heating. The thermal sensor is placed in the duct and will signal the pump to increase speed to provide more hot air from the system to maintain a fixed air temperature to the duct. A bypass or shunt mode can also be provided for a heating system.

Temperature Setpoint Cool—This is the inverse of Setpoint Heat and allows the circulator to pump cold water into a fan coil system for air conditioning. The thermal sensor is placed on the piping or in the duct and will signal the pump to increase pump speed as well as fan speed, to provide more cool air from the system. The Setpoint Cool also has a standby feature to prevent excessive cooling in the system, to prevent condensation in an air-cooled building.

Bypass or shunt mode—The pump operates when the temperature of fluid or hydronic fluid returning to the boiler is below the pre-set target temperature required to prevent damage from condensing fluid or thermal shock. The pump activates to pump hot water directly from supply to return and to thus increase the temperature of the returning water to prevent boiler damage.

The present invention provides a much improved, more efficient and less costly, electric motor, having at least equal capability with regard to use for the variable pumping of hydronic fluids for both heating and cooling. The structure of the present invention utilizes an inexpensive ceramic ferrite permanent magnet mounted directly to the rotor shaft and a direct input of rectified AC line voltage, e.g., 170 volts DC or 340 volts DC, connected directly to the pump motor electronic controller, to power the motor. The present invention can be powered from the usual AC electric circuit source of 115-120 volts, 60 Hertz, as available in most U.S. residential units, or from a 240 V, 50 Hz current, as is available in countries outside of North America or in commercial or industrial locations in the U.S. In all cases the electronic controller provides the pump motor with rectified, sinusoidally varying, e.g., 170 volts DC or 340 volts DC current, resulting directly from the rectification of the line AC current, to power the motor, and for controlling motor speed by sinusoidally varying the frequency of the rectified direct current. By incorporating a PFC boost circuit into the system control boards, a bus voltage of up to 400 VDC can be achieved.

The rotor and stator of the present invention are both elongated, to meet the spatial requirements of the somewhat larger ferrite magnet being used, and to be able to encompass the increased number of turns of wire forming the stator, to achieve the desired magnetic flux from the lower current flow to the motor from the high voltage power, and the weaker ferrite magnet forming the rotor.

For example, for a common small pump motor, a suitable rare earth motor rotor, with an internal backiron, would be about 0.5 in. long, but when using a common ferrite magnet rotor, the rotor must be elongated to about 1.4 ins. long, to achieve a similar power output. However, it is well-known in the art to manufacture an anisotropic ceramic ferrite magnet. When using an anisotropic ceramic ferrite magnet, the magnetic flux can be greatly increased (up to about 1.8 times that of a common ferrite magnet rotor), depending upon the method of manufacture. So that, for example, following the preceding examples, using an anisotropic ferrite magnet rotor 1.4 ins. in length, allows for greater output and efficiency, with lower noise, but is less costly than a rare earth magnet.

The electronic commutation for the permanent magnet rotor motor can be provided, by way of example only, by an operational amplifier ("OPAMP") and a comparator, operating in combination with the OPAMP, along with a microprocessor. These electronic control elements are all mounted preferably in the motor case. This motor is further improved by using the sinusoidal wave function for motor control of this invention, which results in a far quieter and more effective control system, and greatly improves the efficiency of the controlled operation of the circulator. Electronic systems for providing sinusoidally varying direct current voltage are well known to the art and do not, themselves, form a part of this inventive combination described herein. The lower current flow reduces the heat generated in the motor, although the stator further includes a greater number of wiring turns to compensate for the lower current flow at the higher voltage, in order to obtain the necessary magnetic flux.

As a result of the reduction in the inductance created between the electrical coils and the ferrite permanent magnet which does not include a back iron, as is commonly used with rare earth magnets, and the ability to drive the system with greater force without fear of demagnetization of the ferrite permanent magnet, the system can be smoothly controlled, from a full stop to maximum flow, by providing for sinusoidal changes in the magnetic flux from the stator electromagnets created by the sinusoidally varying direct voltage.

Moreover, the flux from a standard ceramic ferrite magnet can be further increased by orienting the magnet so as to form an anisotropic ferrite magnet. It is also well-known that the flux can be increased further, again, without changing the ferrite material, by forming a Halbach array, anisotropic ferrite magnet. By increasing the flux, the number of wire turns in the stator need not be increased, or increased less, as compared with the use of rare earth permanent magnets. The advantages of the ferrite magnet regarding inertness to the wet environment and maintaining magnetic quality at higher temperatures, and the higher voltage and lower current flow, remain, in each of the above cases.

This pump motor includes programmable circuits that are capable of being readily programmed to operate in many different configurations as is needed, depending upon the requirements of the overall flow system. The necessary data are provided to the motor controller from temperature sensors suitably placed in the flow systems. Specifically, the algorithms that can be programmed into each of the printed circuit boards, or the firmware, controlling the motor, can provide for operation of the system under any of the potential modifications, including inherently allowing the pump to operate based upon a "A-temperature with pre-purge ramp up feature algorithm", which provides for gradually increasing the speed of the pump motor, and thus the flow rate in the flow system, until the desired temperature differential is achieved; a "Temperature Setpoint Cool algorithm"; "a close loop system with drain back algorithm", especially useful for solar energy systems; a "Temperature setpoint heat mode with protection of the boiler algorithm", including the use of several temperature sensors in the flow system; and "Boiler protection shunt or bypass mode." These four modes are each part of the software programmed into the controller chips connected into the pump controller microprocessor; additional algorithms can be programmed in as deemed necessary for other desired changes in the operational control of the pump system, or operation under a wholly different program.

BRIEF SUMMARY OF THE DRAWINGS

FIG. 1A is an exploded view of the circulator of FIG. 1;

FIG. 4 is an isometric, diagrammatic view of the permanent magnet rotor of FIG. 1;

FIG. 5 is a front end view of the rotor of FIG. 4; and

FIG. 6 is a cross-sectional view along lines A-A of FIG. 5 of the permanent magnet rotor of FIG. 4;

FIG. 7 is an exploded view of the permanent magnet rotor of FIG. 4;

FIG. 9 is an exploded view of the power supply control section of the pump motor case, including the LED screen and the power supply control printed circuit board;

FIG. 10 is a flow chart of the algorithm controlling the circulator of the present invention for a closed loop solar heating system, including a safety feature;

FIGS. 16a-e are diagrammatic illustrations of flow systems in the HVAC field in which the circulators of this invention are useful.

FIG. 16a is a series loop system, including zone valves which maintains a constant temperature differential across the series of loops;

FIG. 16b is a multi-zone system of radiant manifolds with loop actuators, again utilizing a constant Delta T maintained across the entire system between the boiler output and the return fluid to the boiler, while also providing boiler protection via a by-pass line;

FIG. 16c is a set point heating system where the speed of the circulator is programmed to be varied in order to maintain a fixed temperature in either the supply sensor or the boiler return sensor. In addition, there is a provision for boiler protection, by decreasing circulator speed, and thus the flow rate, when the liquid returning to the boiler is at too low a temperature to avoid temperature shock to the boiler and resulting flue gas condensation;

FIG. 16d is an alternative boiler protection system which provides for a bypass in the event of extremely low temperature in the return system, increasing flow rate from the circulator to allow for the by-pass; and FIG. 16e provides for a heating or cooling system where cooled or heated air is blown into the desired location and the circulator speed is programmed to be changed in accordance with the necessary temperature requirement for the fan coil, specifically whether a coolant or heating liquid is being circulated.

DETAILED DESCRIPTION OF THE INVENTION

Figure 1:
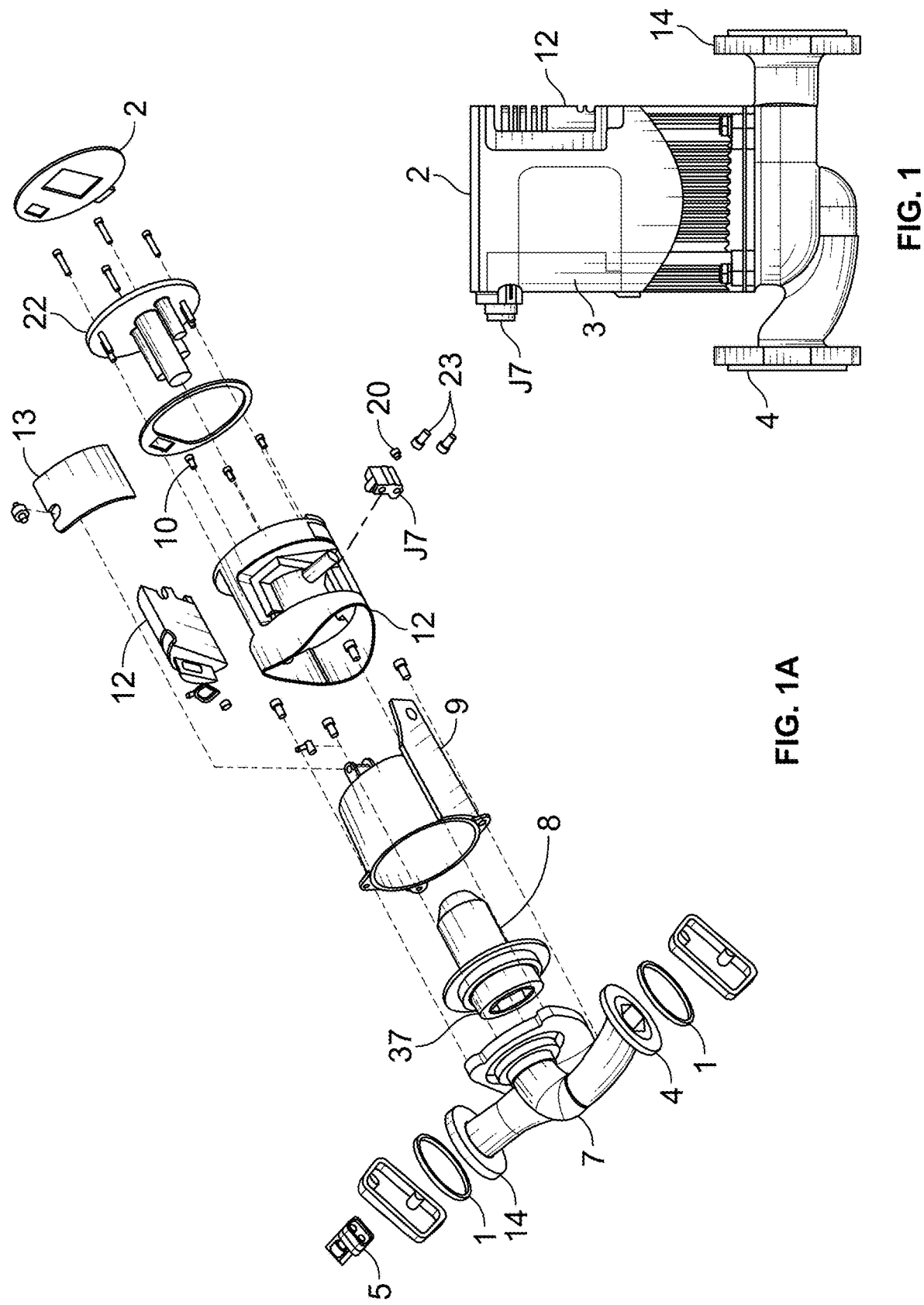
FIG. 1 is a side elevation view of a circulator in accordance with the present invention.
Figure 8:
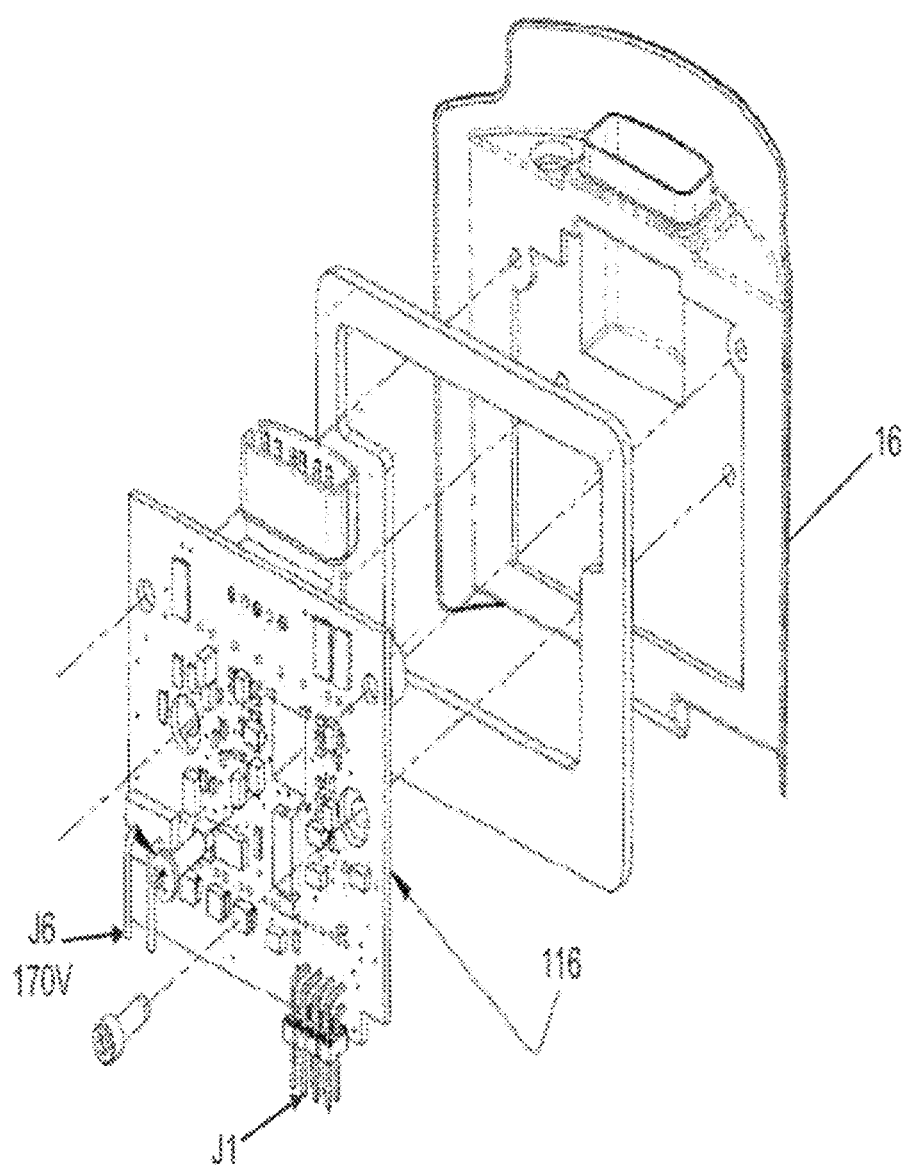
FIG. 8 is an exploded view, showing the motor drive control portion of the pump motor, and how it is attached to the main casing of the pump-motor.
Figure 8A:
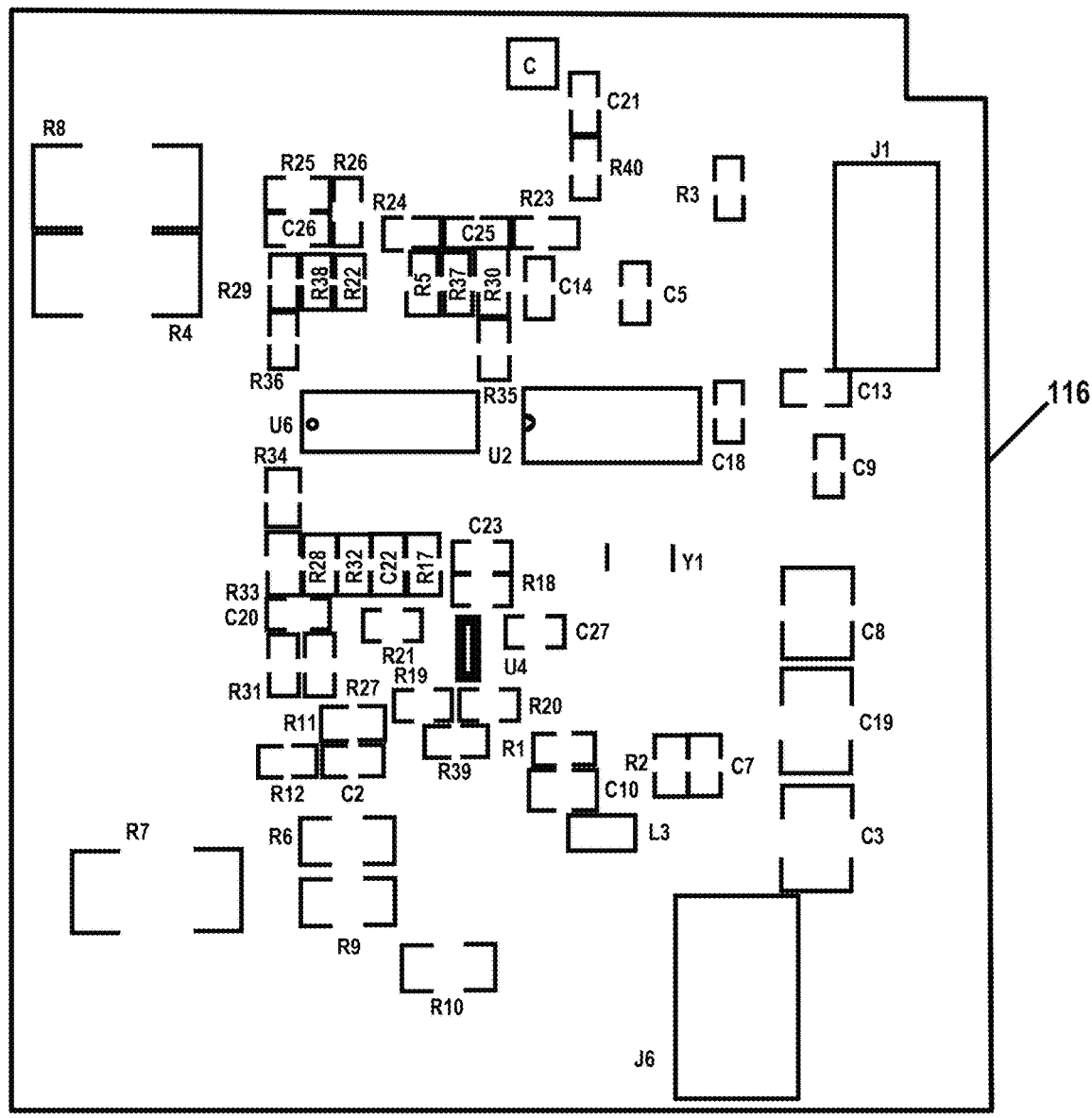
FIG. 8A is a detailed view of the motor drive control printed circuit board, including the several elements of the circuit.
Figure 9A:
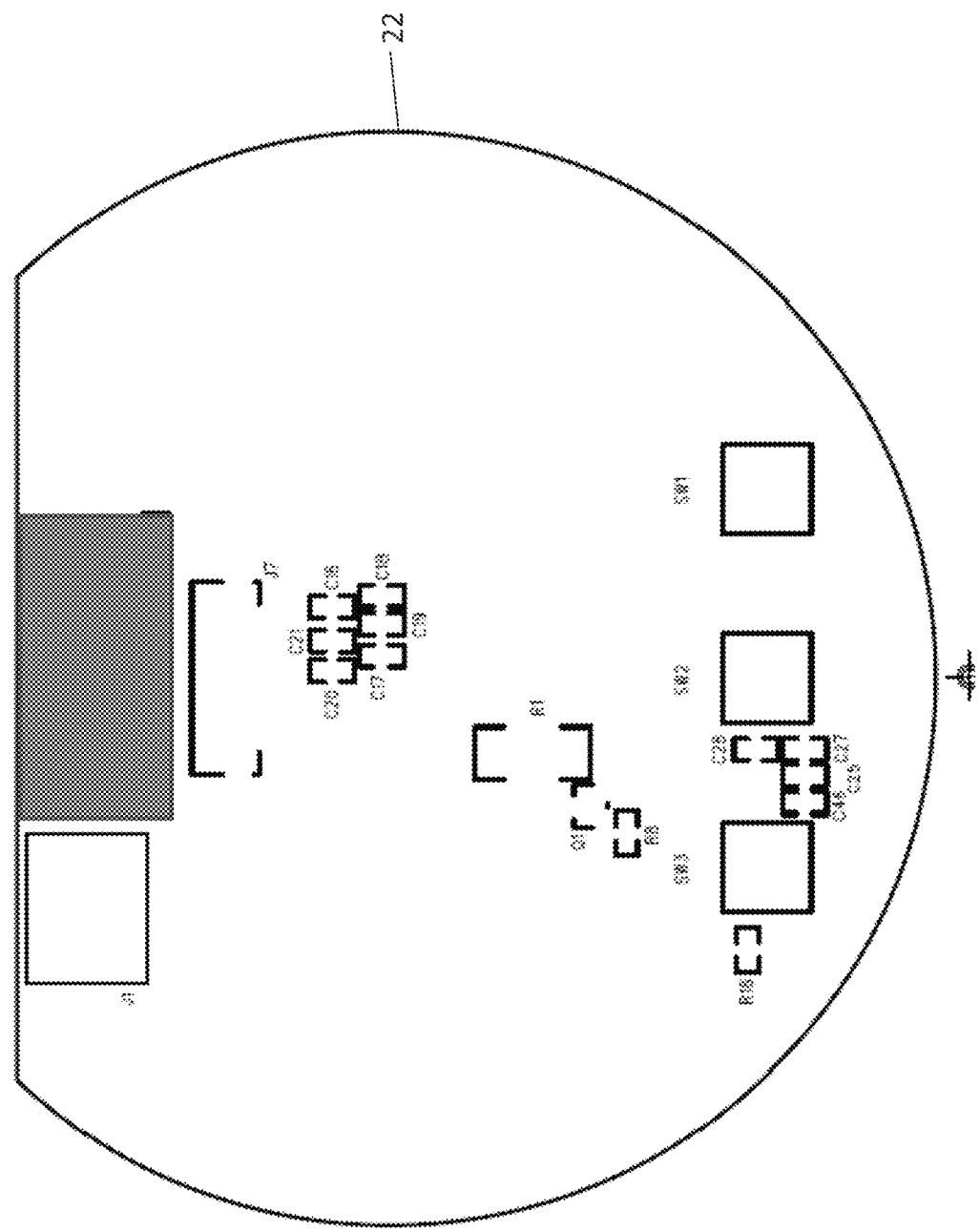
FIGS. 9A and 9B are the front and back diagrammatic views, respectively, of the printed circuit board controlling the power supply to the pump motor.
Figure 9B:
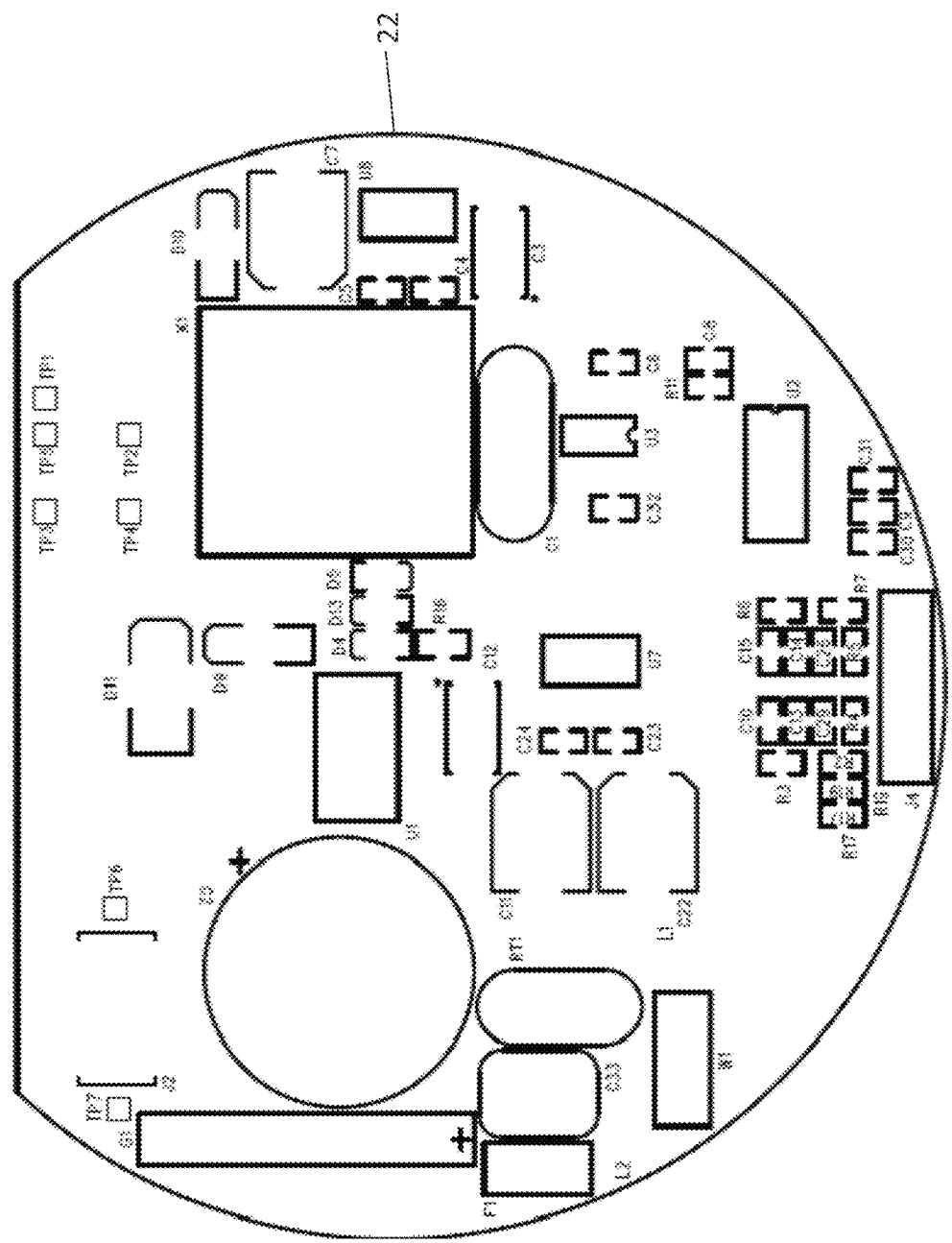

Referring to the drawings, the circulator includes an impeller 37, which is directly connected to a permanent magnet rotor 8 in the pump motor. The impeller 37 is held within the impeller chamber 7 and moves the fluid between the fluid inlet 4 and the fluid outlet (see FIG. 1A). The motor is controlled by the Central Processing Unit (the "CPU") and Digital Signal Processor ("DSP"), on the printed circuit board ("PCB") of the motor control board, generally indicated by the numeral 116, which is directly connected to the stator windings within the housing 9. A diagram of the motor control PCB 116 circuitry is shown in FIG. 8a. The details of the sensor and power control PCB are depicted in FIGS. 9, 9A, 9B, and is generally shown by the numeral 22 in FIG. 1A The high voltage power is passed from the power control PCB 22 via the connectors TP6, TP7, to the motor control PCB 116 through the two-pin header J6.

Figure 2:
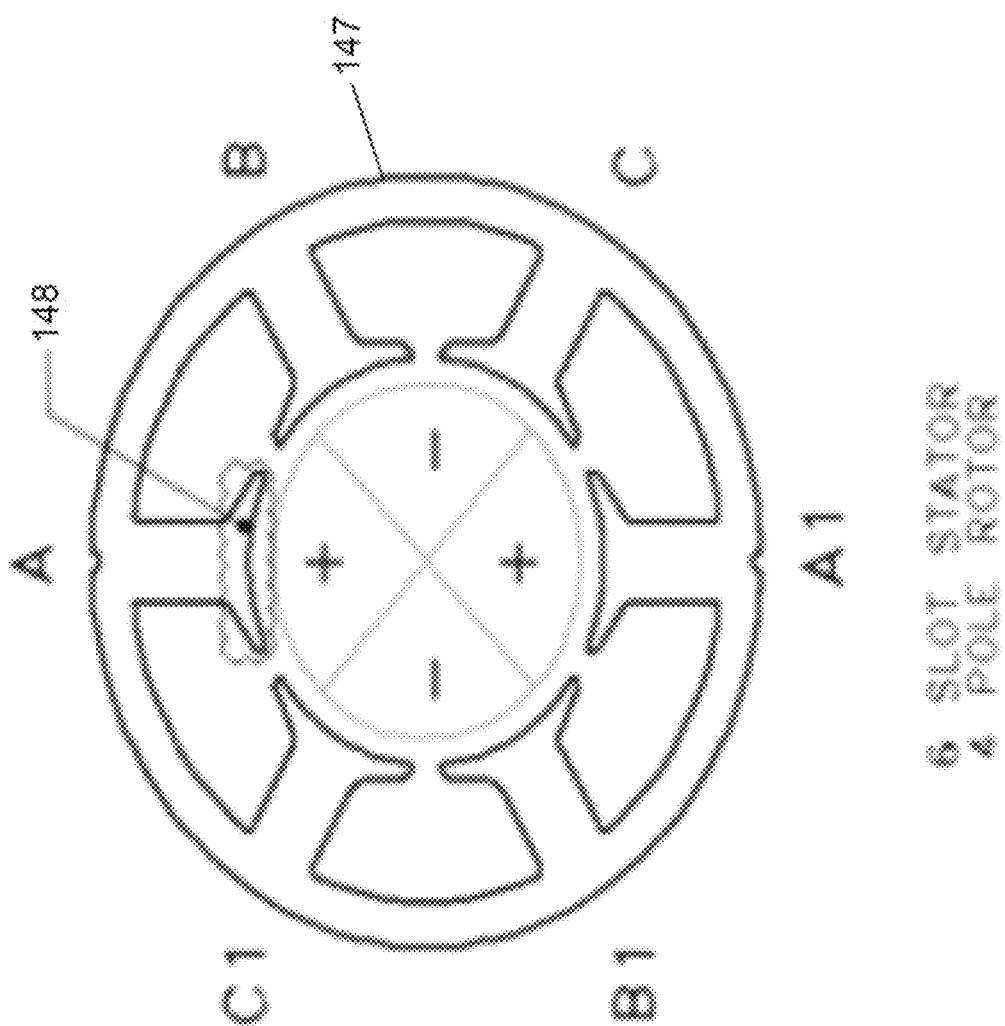
FIG. 2 is a front, internal view showing the stator slots and the rotor where the windings have not been applied to the stator, so as to show the stator shoes and slots of the circulator in FIG. 1.
Figure 3:
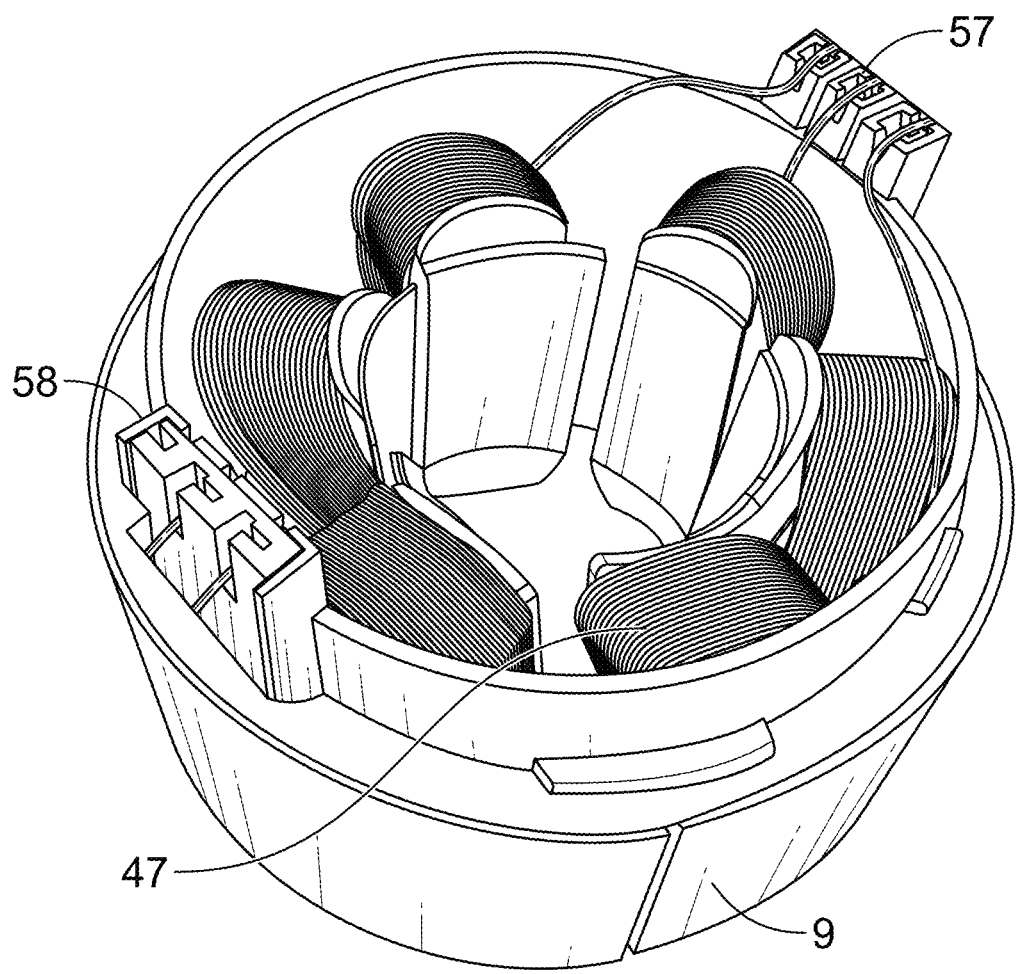
FIG. 3 is an isometric view of the stator of FIG. 2, including the windings and the electrical power connection points.

The details of the stator are shown more fully in FIGS. 2 and 3, where the windings are shown in FIG. 3 indicated by the numeral 47, around coil shoes 147, as shown in FIG. 2, before the wire is wound around the coil shoes 148. These shoes are formed of laminated layers and the windings are made as shown, where the connection of the electrical DC power from the motor control PCB, to the stator windings 47, is through the contacts TP6. TP7, to contacts 58, 57 on FIG. 3.

The power supply printed circuit board 22 includes the two lines power contacts from the line voltage W1, which can be 112-120 Volts AC or 240 Volts AC, to a rectifier G1 to convert the power to DC, e.g., 115 VAC to 170 VDC, or 240 V AC to 340 VDC. The rectified power is then transmitted to the PCB of the motor control board 116, via power contacts J6, which then powers the operation of the motor, and thus the pump, through Its microprocessor, utilizing the data received from the sensors transmitted to the motor control board via 8-pins connector 17. The signals from the temperature sensors, or thermistors, are passed on from the thermistors (not shown in FIGS. 8-9B) to provide data to the DSP and the CPU through the connection J7, controlling the frequency of the power output to the motor stator windings 58.

The commutation is effected in a so-called sensorless, electronic manner, utilizing the operational amplifier (OPAMP) and the comparator U4 forming a part of the PCB system and thereby allowing the full rectified voltage (e.g., 170V from a 120 VAC line) to power the pump. The larger ferrite magnet and the somewhat resultingly larger diameter of the stator 148 allow for the additional space required by U.S. regulation to handle the higher voltage and result in a more efficient system, as compared to previously available pump motors and their controls. The thicker ferrite magnet, as compared to the use of magnets containing an environmentally problematic rare earth metal, such as Neodymium, is less likely to be demagnetized at higher power outputs as well as at higher temperatures, and therefore can be used under more extreme conditions of operation, and for liquids that may be highly corrosive, such as salt water. The ceramic ferrite magnet is highly resistant to chemical corrosion.

Further by utilizing the higher voltage, without requiring a transformer, the motor is allowed to run at a lower temperature than with the lower voltage power. The higher voltage allows for the lower current flow through the stator windings, and thus reduces heat loss and raises efficiency.

Figure 4A:
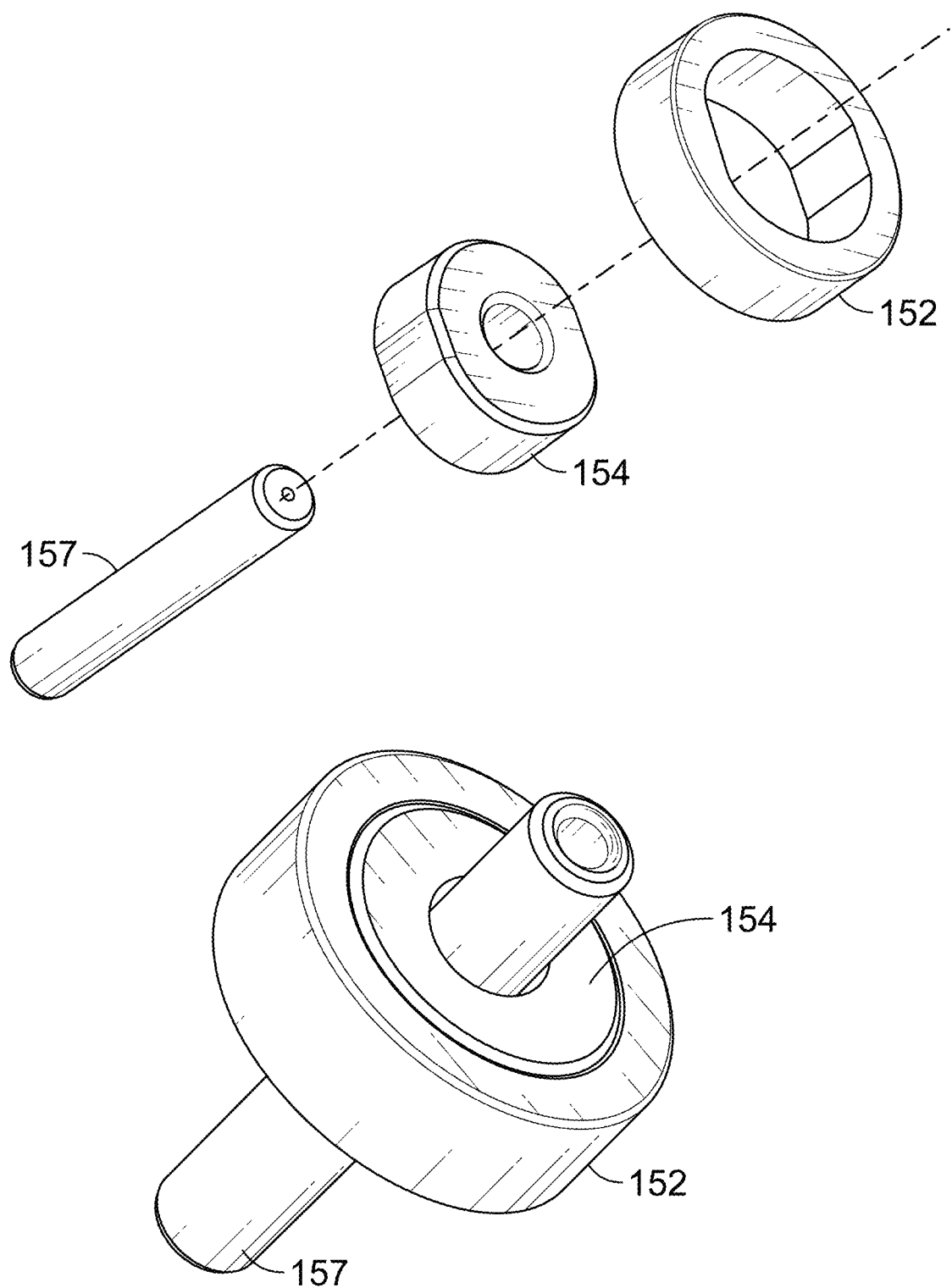
FIG. 4a is an isometric exploded view and an isometric view of a prior art version of a permanent magnet rotor for a prior art DC motor.

The ferrite magnet on the rotor, by avoiding the use of a back iron usually required when using rare earth magnets, avoids the corrosion of a back iron. A back iron 154, as shown in FIG. 4a, for example, increases the weight of the rotor, making it more difficult to balance the rotor, although the additional copper wire turns required to compensate for the lower magnetic flux of the ferrite magnet maintains the total weight of the motor. However, heat losses due to the higher current in the prior pumps are reduced by operating with a lower current in the present invention. Although the additional copper wire windings increase heat losses linearly, due to electrical resistance "R", the effect of the lower current "1", resulting from the increase in voltage from 12 VDC in prior pumps to 170 or 240 VDC in the pump of the present invention, has a geometric effect on power loss as a result of the power loss equation, heat loss=$I^2R$. Accordingly, lower heat losses result in greater efficiency.

Without the back iron, the stator electromagnets are able to be easily magnetized sinusoidally, resulting in fewer harmonics as the polarity is switched, which also contributes to lower power losses, as well as a reduction in vibration noise, both electrical and audible. Using a back iron causes the flux through the permanent magnet to be purely radial and through the stator electromagnet to be purely radial, resulting in rapid change from positive to negative polarity of the stator as the polarity of the electricity is varied by the commutator/controller. This results in a trapezoidal profile which is not as efficient or as quiet, as the sinusoidal profile provided by the present invention.

The electrical connections W1 to the line voltage on the power PCB comprise insulation displacement connectors. When alternating current is converted to DC voltage by the bridge rectifier and capacitor on the power PCB, the bus direct current voltage provided to the motor control board is 170 volts DC, assuming the usual 115-120 V AC house current circuit in the U.S. The increased bus voltage requires a larger space in the motor compartment, which is also required by the larger, but less costly, ferrite magnet; this not only eliminates a transformer, but also increases efficiency by reducing heat generated from higher current resistance losses, when operating at low voltages, e.g., about 12V in prior art motors, requiring higher current flows to provide the necessary power for the motor.

The rectification of the 115-120 volt alternating current to 170 volt direct current, is accomplished with well-known systems, such as a bridge rectifier combined with a capacitor, which is located on the power supply board 22, located behind the LED screen 17. When operating in a locale using 230-240V AC current, direct current of 340V DC is obtained, thus requiring changing primarily the capacitors to avoid damage at the higher voltages. The resulting direct current is passed via a two-pin connector to the motor control board 116. The data signal input from the thermal sensors, or thermistors, is also located on the motor control board 22, which then transmits the data signal to the motor control board 116, via an eight-pin connector utilizing low voltage signal connections.

The direct current in the motor control board 116 is acted upon by an IGBT power module, which includes a 3phase inverter U1, to form the artificial, sinusoidally varying direct voltage fed to the motor to control its speed, together with the microcontroller U2, on the motor controller board 116. The frequency of the voltage is then varied using the operational amplifier ("OP AMP") U6, a comparator U4 and a resonator Y1, controlled from the microcontroller U2, acting upon the signal from the thermistor with respect to determining whether to increase or decrease the oscillating frequency of the current as required to meet the fluid flow demands of the system. The various above listed electronic components, the operational amplifier ("OP AMP") and the comparator are readily available commercially, from Microchip, Diodes, Fairchild, and Texas Instruments, for example. It is understood that increasing the frequency of the sinusoidal current oscillations will increase the pump speed and thus the liquid flow rate.

The comparator, which may be a form of OPAMP, but is preferably a separate unit on the motor controller 116 PCB, acts as a commutator so as to continuously determine the angular position of the rotor poles relative to the stator, based upon the back EMF of the system, i.e., as generated by the rotor permanent magnets on the non-electrified stator windings. One example of a suitable Op Amp is the Texas Instruments LMV3441 type of unit.

A ceramic magnet is generally formed of ferromagnetic ceramic compounds derived from iron oxides such as hematite ($Fe_2O_3$) or magnetite ($Fe_3O_4$), and preferably includes oxides of other metals, such as strontium or barium. These ceramic materials are preferably not electrically conductive, i.e., have a high resistivity, and are highly resistant to further oxidative corrosion.

To obtain the necessary fine control over motor speed and acceleration and efficiency, the present system also includes a digital microprocessor, or microcontroller, on each of the motor control and power control PCB's. The motor control PCB responds to the signals from, e.g., the thermistor sensor, as passed from the Power board microcontroller, in accordance with the installed program that a particular fluid system is intended to operate. The desired program can be selected using the three buttons SW1, SW2, SW3, on the front face of the power Supply Board, which are connected to the microcontroller board on the Power board. By following the selected program in the microcontroller, the speed of the motor rotor is selected to match the pump impeller speed required to meet the need for cooling or heating fluid flow in the system. The thermistors are connected to the microcontroller so as to provide the needed data for the microcontroller to maintain the necessary speed of the motor as system temperature conditions may change.

The higher bus voltage permits the use of a graphical liquid crystal display (LCD) with backlight, allowing more information to be provided on the screen to an operator, as compared with the prior art numerical LED displays.

Again referring to the drawings, the stator provides six slots 148 for the electrical wire windings 47. Power is provided to the electrical windings through the connection links 57, 58. The rotor, which has four poles (two positive and two negative poles) rotates concentrically within the stator core and, in one embodiment, includes a permanent strontium ferrite magnet (64), surrounded by a plastic coating. The rotor 60 is locked, or keyed, by keys (62) to the rotor shaft 66, so as to rotate without slippage when the current is provided to the stator and the stator polarity is sinusoidally varied. The motor control PCB 16 contains software, including firmware, and is held within a portion of the electronics enclosure 12.

The motor control PCB controls the speed of the rotor 60, and thus the pump impeller, acting upon temperature data received from the thermistors through the connection J7; the temperature data is initially passed through the sensor and power control microprocessor, which then passes the transformed data, through the 8-pins connector J1 to the motor control board. The motor control board microprocessor sends instructions to vary the electrical frequency of the sinusoidal curve to operate the pump in accordance with its software to maintain the fluid flow from the pump at the value required to maintain the desired flow system temperature, as measured by the thermistors. By combining both an OP AMP and a comparator, the error-inducing effect of electrical noise is reduced and the sinusoidal curve smoothed so that there is less vibration and a greater efficiency in the operation of the pump. The software provided on the overall system controls the current polarity in a sinusoidal curve, as opposed to a trapezoidal drive curve primarily used by the prior art using rare earth metal permanent magnet rotor and a 12 V DC input. trapezoidal drive curve primarily used by the prior art using rare earth metal permanent rotor and a 12 V DC input.

In FIG. 8a, is shown an example of an overall circuit diagram for the motor control PCB 116, showing the inter-relationships among the OPMAP, the Comparator and the Microcontroller, that renders the system especially efficient and durable. Referring to FIGS. 8 and 8a and 8a, the electronic elements are identified in Table 1, below. Referring to FIGS. 9a and 9b, the electronic elements are identified in Table 2, below.

TABLE 1

| QTY | REFDES | DESCRIPTION |
|---|---|---|
| 10 | C10, C23, C14, C15, C16, C17, C18, C19, C20, C21 | CAP CER 1.0 UF 15 V X7 R 10% 0603 |
| 1 | C2 | CAP ELECTROLITIC RAD, 18 × 40 MM, 220 UF, 250 V, 20% |
| 5 | C25, C27, C28, C30, C46 | CAP CERAMIC 100 PF 50 V 0603 SMD |
| 2 | C3, C12 | CAP TANTALUM 47 UF 10 V 20% SMD |
| 1 | C33 | CAP METAL POLY 7.9 × 6 MM, .1 UF, 250 V, 10% |
| 6 | C4, C5, C23, C24, C26, C29 | CAP CERAMIC CHIP, 0603, .001 UF, 50 V, 10% |
| 3 | C6, C31, C32 | CAP .1 UF 10 V CERAMIC X7 R 0603, 10% |
| 3 | C7, C11, C22 | CAP ELECTROLITIC, SMT 6.3 MM, 100 UF, 25 V, 20% |
| 1 | C8 | CAP CERAMIC CHIP, 0603, .01 UF, 50 V, 10% |
| 1 | C9 | CAP CERAMIC CHIP, 0603, 10.0 UF, 10 V, 20%, X5R |
| 1 | J1 | 2 × 4 8 PIN .100" SMD, REAR ENTRY, ALIGNMENT PINS |
| 1 | J2 | 1 PIN, POWER, SOCKET, .200' |

TABLE 1-continued

| QTY | REFDES | DESCRIPTION |
|---|---|---|
| 1 | J4 | TERM BLOCK HDR 3.81 MM 2 POS PCB |
| 1 | J7 | CONN FPC/FFC 18 POS, .5 MM HORZ SMD, CONTACTS TOP |
| 2 | L1, L2 | FERRITE CHIP 2 AMP, 220 OHMS @ 100 MHZ |
| 1 | Q1 | NPN TRANSISTOR, DARLINGTON, SOT23, 40 V, 500 MA |
| 1 | R1 | RESISTOR CHIP, TKF, 2010, 47, 5% |
| 1 | R16 | RESISTOR CHIP, TKF, 0805, 6.8, 5%, 100 PPM |
| 3 | R17, R18, R19 | RES 10K OHM ¹⁄₁₀ W 5% 0603 SMD |
| 5 | R2, R3, R6, R7, R8 | RES 4.7K OHM ¹⁄₁₀ W 5% 0603 SMD |
| 3 | SW1, SW2, SW3 | SWITCH TACT 5PST 7.0 MM HEIGHT, SMD |
| 1 | U4 | COMPARATOR |
|  | U2 | MICROPROCESSOR, 28 PIN SSOP |
| 1 | U3 | IC, DUAL DIGITAL ISOLATORS, 1 MBPS VOLTAGE REGULATOR, 3.3 VOLT, 4 PIN, SOT-223 |
|  | U6 | OP AMP |
| 1 | W1 | 2 WIRES, BLACK & WHITE W/GROMMET |
| 1 | Y1 | RESONATOR |
| 1 | — | PRINTED WIRING BOARD, |
| 1 | 1 | ELECTRONIC ENCLOSURE, LCD |
| 1 | 2 | LCD PANEL |
| 2 | 4 | SCREW #4 × ¼" |

TABLE 2

| QTY | REFDES | DESCRIPTION |
|---|---|---|
| 1 | C1 | CAP, 2200 PF 200VAC CER RADIAL, Y2 SAFTY, DIA 9 MM, 10 MM LEADS |
| 10 | C10, C13, C14, C15, C16, C17, C18, C19, C20, C21 | CAP CER 1.0 UF 16 V X7 R 10% 0603 |
| 1 | C2 | CAP ELECTROLITIC RAD, 18 × 40 MM, 220 UF, 250 V, 20% |
| 5 | C25, C27, C28, C30, C46 | CAP CERAMIC 100 PF 50 V 0603 SMD |
| 2 | C2, C12 | CAP TANTALUM 47 UF 10 V 20% SMD |
| 1 | C33 | CAP METAL POLY, 7.9 × 6 MM, 1 UF, 250 V, 10% |
| 6 | C4, C5, C23, C24, C26, C29 | CAP CERAMIC CHIP, 0603, .001 UF, 50 V, 10% |
| 3 | C6, C31, C32 | CAP .1 UF 10 V CERAMIC X7 R 0603, 10% |
| 3 | C7, C11, C22 | CAP ELECTROLITIC, SMT 6.3 MM, 100 UF, 25 V, 20% |
| 1 | C8 | CAP CERAMIC CHIP, 0603, .01UF, 50 V, 10% |
| 1 | C9 | CAP CERAMIC CHIP, 0603, 10.0 UF, 10 V, 20% XSR |
| 1 | D10 | RECTIFIER DIODE, SMA, 100 V, 1 A, TR = 50 NSEC |
| 1 | D11 | ZENER DIODE, 5 MB, 200 V, 3 W |
| 1 | D4 | ZENER DIODE, SOD323, 9.1 V, 200 MW |
| 2 | D5, D13 | SWITCHING DIODE, SOD323, 25 V |
| 1 | D9 | RECTIFIER DIODE, SUPER FAST, 400 V, 1 A |
| 1 | F1 | FUSE, SLO-BLO, 2.0 A, 125 V, SMD |
| 1 | G1 | BRIDGE RECTIFIER, BGU, 4 A, 400 V |
| 1 | J1 | 2 × 4 9 PIN .100" SMD, REAR ENTRY, ALIGNMENT PINS |
| 1 | J2 | 2 PIN, POWER SOCKET, .200" |
| 1 | J4 | TERM BLOCK HDR 3.81 MM 3POS PCB |
| 1 | J7 | CONN FPC/FFC 18POS .5 MM HORZ SMD, CONTACTS TOP |
| 2 | L1, L2 | FERRITE CHIP 2 AMP, 220 OHMS @ 100 MHZ |
| 1 | Q1 | NPN TRANSISTOR, DARLINGTON, SOT23, 40 V, 500 MA |
| 1 | R1 | RESISTOR CHIP, TKF, 2010, 47, 5 |

TABLE 2-continued

| QTY | REFDES | DESCRIPTION |
|---|---|---|
| 1 | R16 | RESISTOR CHIP, TKF, 0805, 6.8, 5%, 100 PPM % |
| 3 | R17, R18, R19 | RES 10K OHM 1/10 W 5% 0603 SMD |
| 5 | R2, R3, R6, R7, R8 | RES 4.7K OHM 1/10 W 5% 0603 SMD |
| 3 | R4, R5, R11 | RESISTOR CHIP, 10K, 1%, 1/10 W 0603 |
| 1 | RT1 | THERMISTOR, NTC, 10 OHM, 2.0 AMP |
| 3 | SW1, SW2, SW3 | SWITCH TACT SPST 7.0 MM HEIGHT, SMD |
| 1 | U1 | SWITCHING REGULATOR, 265 VAC; 7 W |
| 1 | U2 | MICROPROCESSOR, 28 PIN SSOP |
| 1 | U3 | IC, DUAL DIGITAL ISOLATORS, 1 MBPS |
| 1 | U7 | VOLTAGE REGULATOR, 3.3 VOLT, 4 PIN, SOT-223 |
| 1 | U8 | VOLTAGE REGULATOR, 5.0 VOLT, 4 PIN, SOT-223 |
| 1 | W1 | 2 WIRES, BLACK & WHITE W/GROMMET |
| 1 | X1 | TRANSFORMER, SWPS, 85-265 VAC, 60/50 HZ, 18 VDC, 7 W |
| 1 | — | PRINTED WIRING BOARD |
| 1 | 1 | ELECTRONIC ENCLOSURE, LCD |
| 1 | 2 | LCD PANEL |
| 2 | 4 | SCREW, #4 × 1/4" LG, PAN HD PHILLIPS, STEEL ZINC PLATED, HI-LO THREAD FOR PLASTIC |

The controller 16 is preprogrammed to include the algorithms expressed by the flow charts of FIGS. 10-15.

Referring to the flow chart of FIG. 10 and the flow system diagram of FIG. 16a, these describe the operation and show the flow system for a closed loop, Delta T heating system, with a pre-purge ramp-up feature, utilizing a single operating pump 120 and a boiler type water heater 200. The system includes a supply temperature sensor 210 and a return temperature sensor 212, measuring the temperature of the liquid in the line leaving the boiler heater and the line returning to the boiler heater, respectively. There are multiple loop heating system lines 240, 250, 260, coming off from and returning to the main supply and return lines 220, 230; each loop 240, 250, 260 is controlled by a mechanical valve 241, 251, 261, respectively. The valves, however, are not controlled from the circulator system, but rather are independently controlled, either manually or by some other electronic or thermostatic system.

The operation of the system of FIG. 16a, is shown in the flow chart of FIG. 10, S1 being the supply temperature, sensed by the thermistor 210, and S2 being the return temperature sensed by the thermistor 212. As shown, when the pump 120 is started, the control algorithm determines whether the start-up Delta T meets the required Delta T, as preset in the algorithm. If the Delta T is too small, the pump will be shut down and the temperatures monitored until the Delta T values are reached. In this case, each of the temperatures is set by the operator and, in this manner, the Delta T is maintained without running the risk of having the supply fluid be too low, and the return liquid be so low as to create a problem in the boiler.

The pump is programmed to start at a minimal speed and gradually increased, or ramped up; over the period of the increase, the Delta T is continued to be monitored. At the point where the supply temperature S1, is not greater than a predetermined value, e.g., 10° F., above the return temperature S2, the pump is then slowed. Or, if it is less than a desired temperature, e.g., 180° F., which is usually the default minimum temperature, the pump is shut down. As shown, the pump algorithm is set so as to maintain the desired temperature flow and heating pattern without endangering the boiler. As shown, the safety feature included within this algorithm requires that the return temperature should be within the range of 180-230° F.

Figure 11:
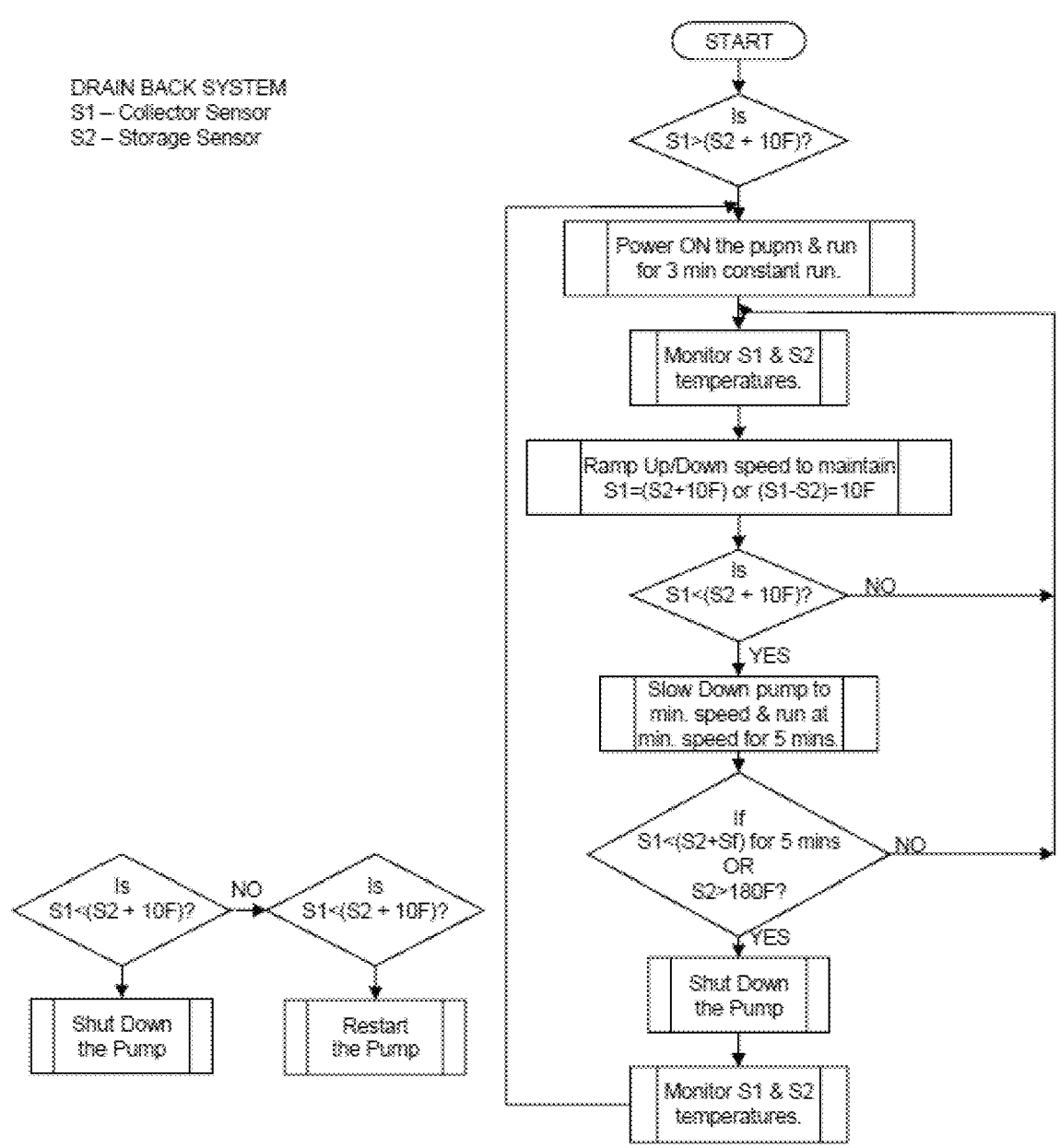
FIG. 11 is a flow chart for the algorithm for a drain back system, including a safety feature.
Figure 12:
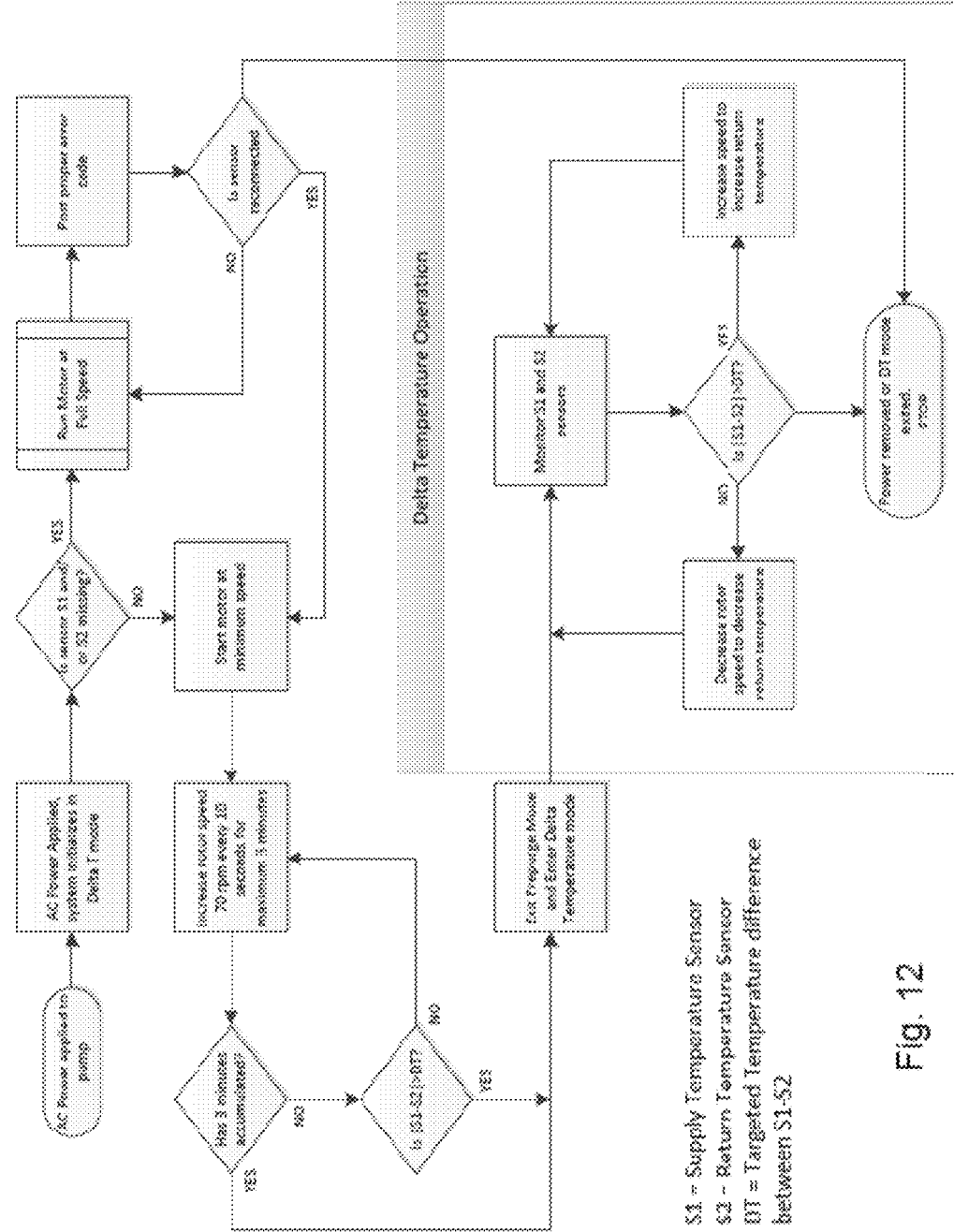
FIG. 12 is a flow chart for the algorithm operating the circulator in accordance with a temperature control including a pre-purge start cycle.
Figure 13:
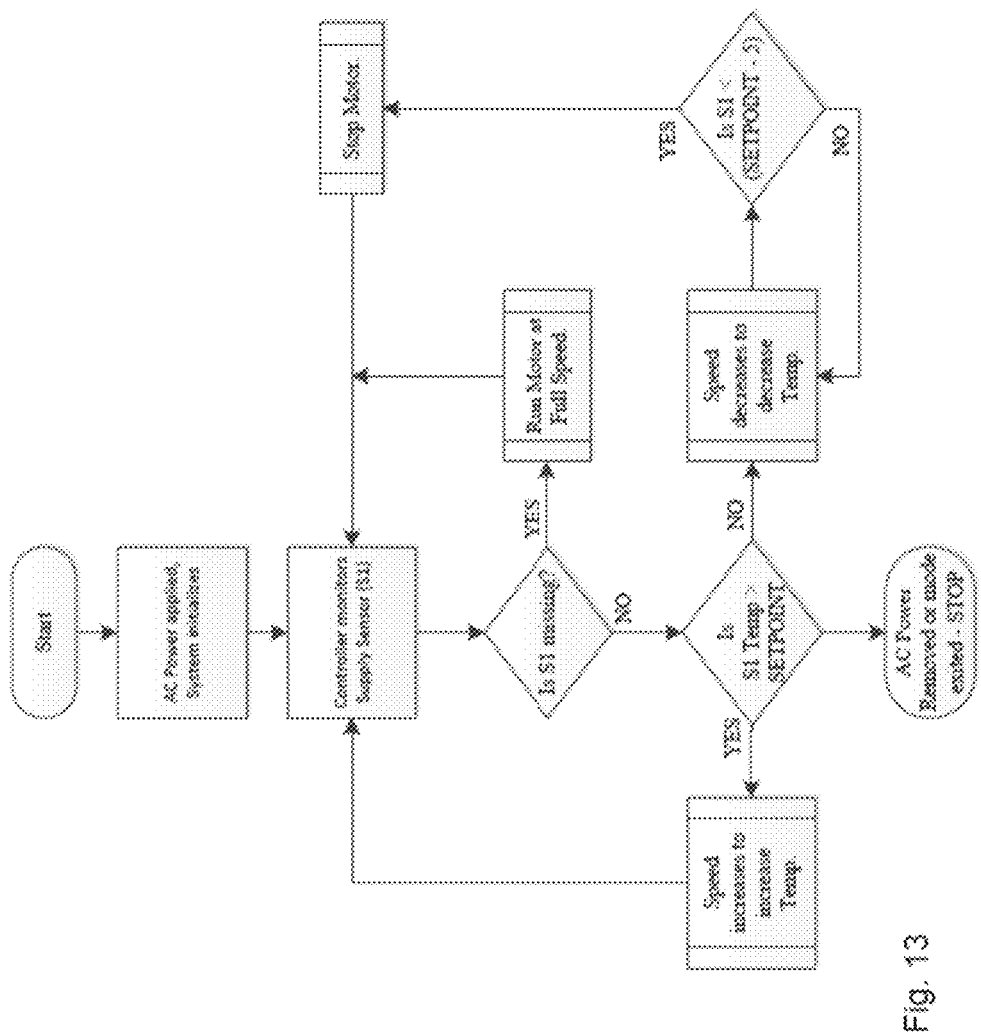
FIG. 13 is a flow chart for an algorithm for operating the circulator in a set point cooling mode.

FIG. 16b is also a Delta T type operation as in the case of FIG. 11, but in this case utilizes radiant manifolds and further includes a separate boiler sensor and an outdoor temperature sensor for a more nuanced control over the amount of heat required, and to avoid damage to the boiler. If the boiler thermistor 312 registers too low a temperature, the by-pass valve 360 is opened, and/or if the return thermistor 312 reads too low, the pump 300 is slowed down.

Figure 16C:
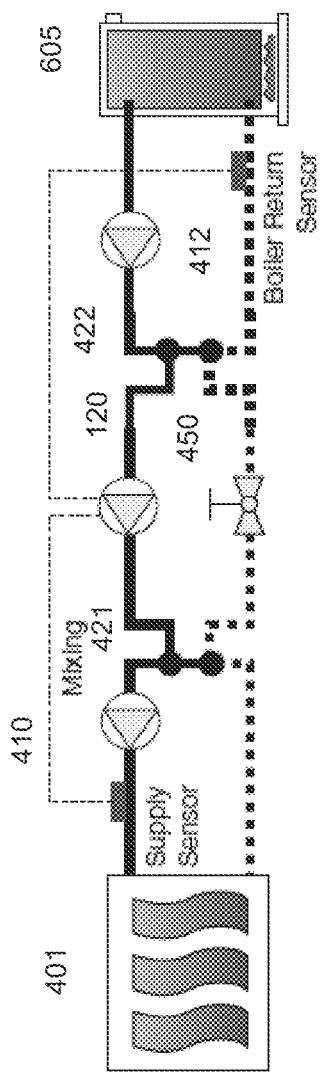

FIG. 16c is a diagram showing the type of flow system for a radiant injection heater and is based upon a predetermined set point temperature, including a boiler return protection option. As shown in the flow chart of FIG. 14, the set point heat mode algorithm is selected and a particular temperature is entered. The controller in the circulator monitors the supply sensor 410 immediately prior to entering the radiation system 401 and also monitors the boiler protection sensor 412 to ensure that the desired amount of heating is provided to the radiation system and that the boiler is protected by avoiding excessively low temperatures on the boiler return line. This system includes three pumps where the center pump 420 is the pump being controlled by the sensors and controllers, the other pumps operating at constant speed, i.e., 421 and 422. When the center pump 120 is started, it is initially put through a series of steps to ensure that the sensors are connected. If S1 is connected and the boiler sensor 412 is connected, the pump rotor speed is set to a minimum speed, as long as the temperature measured by the boiler sensor is below the boiler set point temperature. Once the sensor of the line returning to the boiler reaches a desired set point, and the supply temperature is at the desired temperature set point for that sensor, the speed of the motor for pump 120 increases so as to further increase the temperature. Once the S1 temperature drops below the set point, the speed of pump 120 again increases to increase the temperature. If the S1 temperature set point is above the desired set point temperature, the speed of the controlled pump 120 is reduced until the desired temperature reading is once again reached. The boiler protection in this case, as noted, is achieved by reducing the speed of the pump 120 so as to allow more of the hot liquid pumped through the constant power pump 422 to be directly returned to the boiler via bypass line 450, as the pump 120 will be operating at a lower level than the constant power speed of pump 422. In this way, the fluid returning to the boiler is maintained at a sufficiently high temperature to prevent boiler shock and to prevent condensation of the flue gas exhaust.

Figure 15:
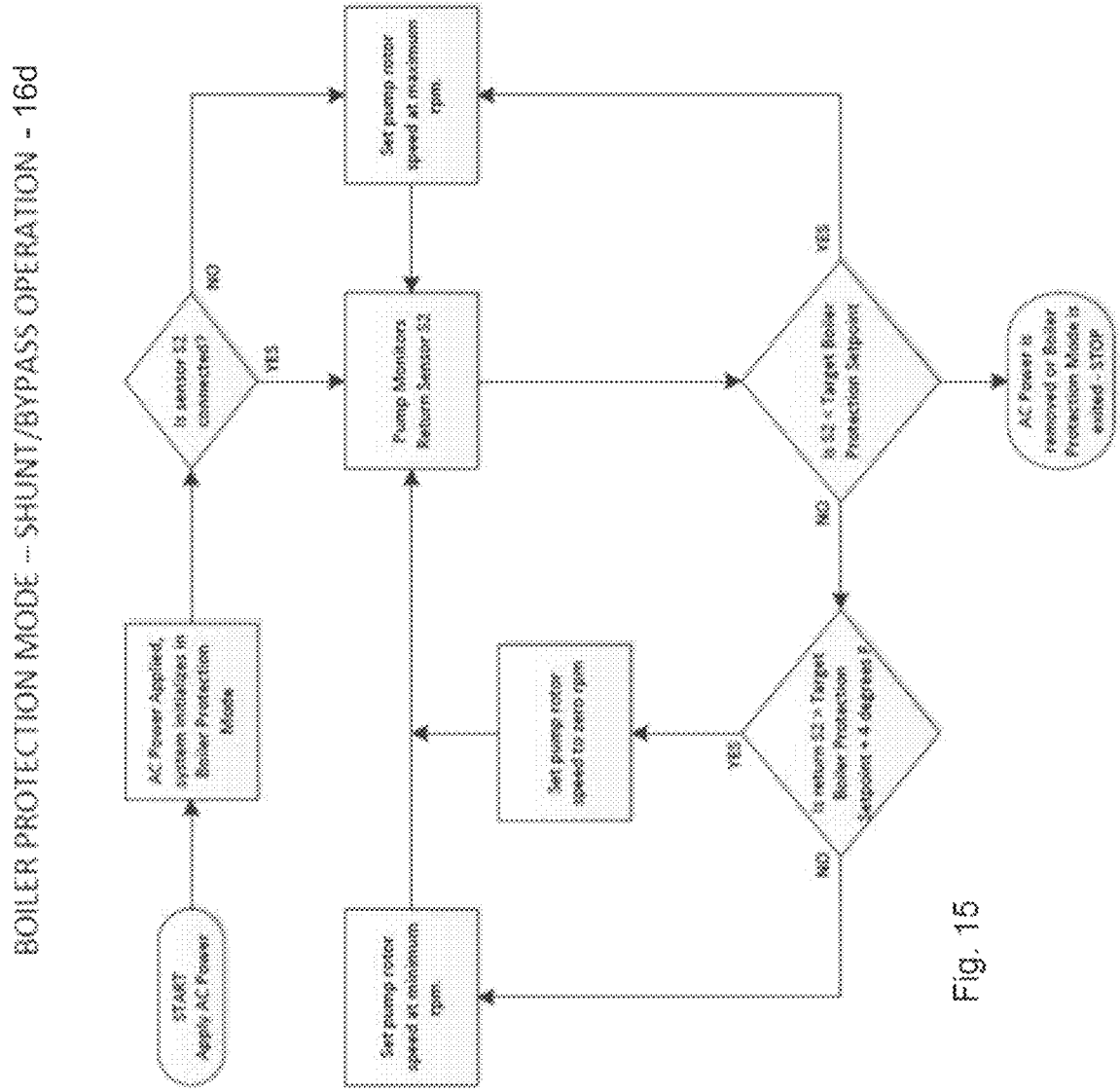
FIG. 15 is a flow chart for an algorithm for operating the circulator of this invention with a boiler protection mode and including operating a shunt/bypass.
Figure 16D:
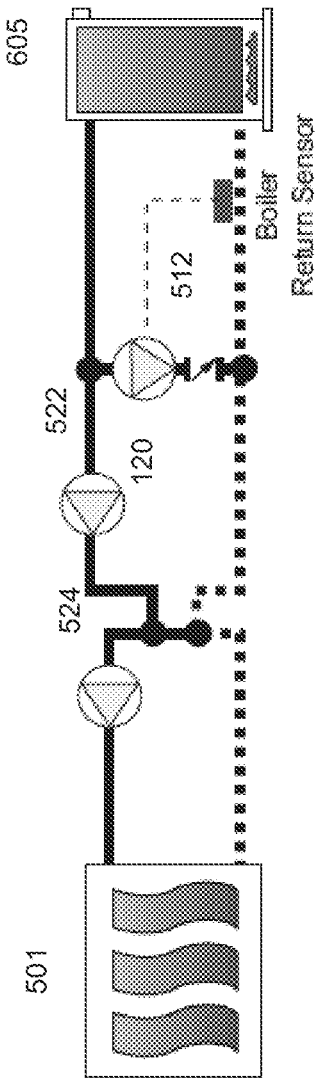

The flow diagram of FIG. 16d includes a shunt bypass method of protecting the boiler from excessively low return temperatures. Such return temperatures are, for example, often met with regard to large venues that are not used on a regular daily basis. For example, large entertainment halls or houses of worship. In the case of FIG. 16d, the boiler protection mode operation of the flow chart of FIG. 15 is useful. This algorithm provides that the initial determination by the system is whether the boiler return sensor 512 is connected and operating and, if so, the pump 120 monitors that sensor. To the extent that the sensor indicates that the temperature is below the boiler protection set point, the pump rotor 120 is set to maximum rpm in order to return a substantial proportion of the hot water back to the boiler to intermix with the returning water from the heating system, thereby slowing down the heating of the venue but also protecting the boiler. Once the temperature has reached above the sensitive boiler protection set point, the pump 120 speed is reduced or turned off, and the remaining two pumps continues to bring hot water to the radiation manifold and then back to the boiler. The boiler return sensor 512 continues to monitor that temperature to ensure that the water is not too low in temperature to prevent boiler shock or to, at worst, cause condensation of the flue exhaust gas.

Figure 14:
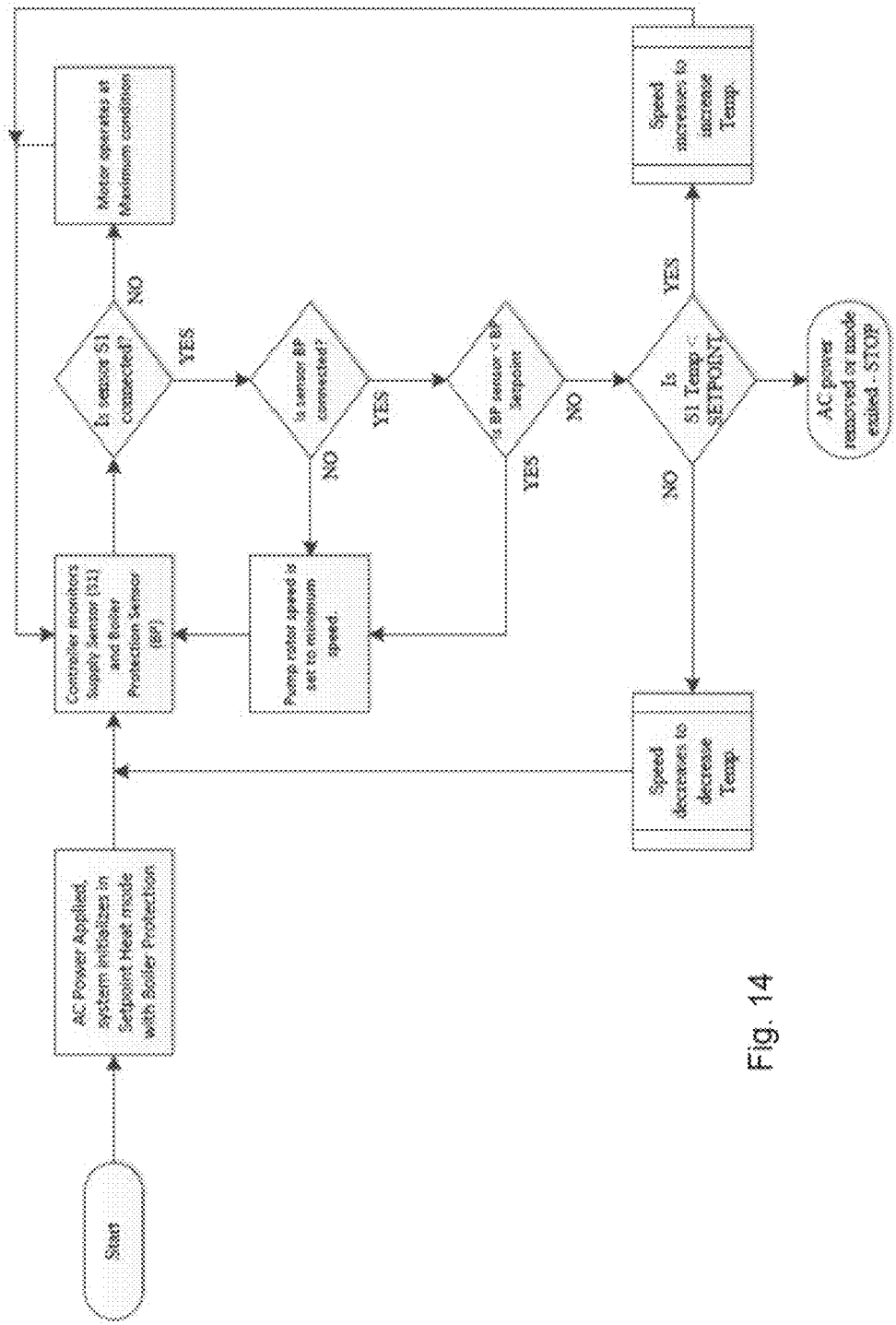
FIG. 14 is a flow chart for an algorithm operating the circulator of this invention under a set point heating mode, including protection against damage to the boiler.
Figure 16E:
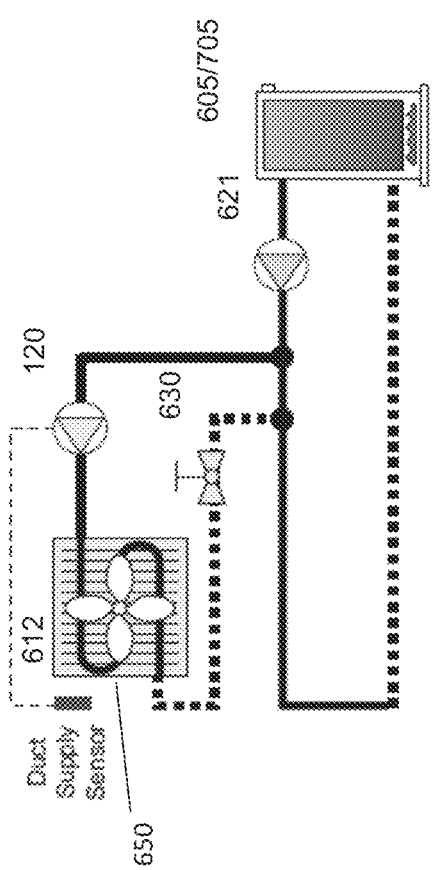

The system of FIG. 14 is a fan-blown air, fixed temperature system and can be used for heating or cooling, dependent upon whether it is connected to a boiler 506 or a cooling system 705. The heated or chilled liquid is brought into the coils of the ducts through which air is blown, and the heated or chilled air is blown through the duct system 650. The supply sensor 612 monitors the air temperature and causes an increased speed of pump 120 for the liquid into the air duct coils, if the temperature is too low, or reduces the flow of liquid, once the temperature reaches to above the desired set point. In this system, an auxiliary pump 621 provides continuing fluid flow of a minimal amount, which is often necessary to maintain the operation of the system, and the flow through the heating or cooling ducts can be reduced or eliminated by operation of the pump 620 or, if the pump is shut down, the valve 630 can be closed, thereby shutting off that system completely. FIG. 16e is operated in accordance with the flow chart of FIG. 15 in the cooling mode.

What is claimed is:

1. A fully enclosed, stand-alone, wet rotor circulator system for a recirculating hydronic fluid system designed to be located within a space to be heated or cooled, wherein the wet rotor circulator system is designed to move hydronic fluid through the recirculating hydronic fluid system, the wet rotor circulator system comprising:
   a wet rotor circulator, comprising:
      a centrifugal impeller,
      an electrically powered, variable frequency DC motor, the variable frequency DC motor being operationally connected to the centrifugal impeller to drive the centrifugal impeller;
      the electrically powered, variable frequency DC motor comprising a permanent magnet rotor formed of at least one ferrite ceramic magnet, and a system of stator coils configured to be powered by a sinusoidally variable DC current;
   an electronic control system electrically connected to the system of stator coils of the variable frequency DC motor, the electronic control system comprising:
      a printed circuit board comprising:
         a rectifier configured to rectify an AC line current to a non-stepped down, rectified DC current, the AC line current providing an AC line voltage in the range of from about 110 Volts to about 250 Volts, the non-stepped down, rectified DC current, being provided at a non-stepped down DC voltage of from about 160 Volts to about 350 Volts, dependent upon the voltage of the AC line current,
         circuitry for receiving electrical thermal data signal from at least one thermal sensor, and
         an electrical circuit connection on the rectifier to connect the rectifier to a source of AC current at the AC line voltage;
      an electronic commutation system designed to form a sinusoidally variable frequency DC current output and having an electrical connection to the rectifier to receive the non-stepped down DC current output from the rectifier; and
      an electronic, variable frequency drive ("VFD") including:
         an electrical connection to the electronic commutation system to receive the sinusoidally variable frequency DC current output,
         an electrical connection to the system of stator coils of the variable frequency DC motor, and
         an electronic connection for receiving the electrical thermal data signal from the at least one thermal sensor via the printed circuit board,
         wherein the VFD comprises a microcontroller configured to interpret the electrical thermal data signal received from the at least one thermal sensor; and
      wherein the VFD is configured to provide power to the system of stator coils and the microcontroller is configured to control, via the VFD, a motor speed of the variable frequency DC motor by varying the frequency of the sinusoidally variable, non-stepped-down DC current powering the system of stator coils of the variable frequency DC motor in response to the electrical thermal data signal received from the at least one thermal sensor, thereby controlling the flow of the hydronic fluid through the recirculating hydronic fluid system to maintain a predetermined temperature within the space to be heated or cooled.

2. The stand-alone, wet rotor circulator system for the recirculating hydronic fluid system of claim 1, wherein the permanent magnet rotor is formed of a plurality of ferrite ceramic magnets.

3. The stand-alone, wet rotor circulator system for the recirculating hydronic fluid system of claim 2, wherein each of the plurality of ferrite ceramic magnets is an anisotropic ferrite ceramic magnet.

4. The stand-alone, wet rotor circulator system for the recirculating hydronic fluid system of claim 3, wherein the plurality of anisotropic ferrite ceramic magnets are formed into a Halbach array.

5. The stand-alone, wet rotor circulator system for the recirculating hydronic fluid system of claim 1, wherein the recirculating hydronic fluid system is configured to be located within a residential building which defines the space to be heated or cooled.

6. The stand-alone, wet rotor circulator system for the recirculating hydronic fluid system of claim 5, wherein the VFD is configured to maintain a designated temperature within the residential building by responding to the electrical thermal data signal from the at least one thermal sensor.

7. The stand-alone, wet rotor circulator system for the recirculating hydronic fluid system of claim 5, wherein the recirculating hydronic fluid system is configured to work with a boiler located within the residential building, and wherein the VFD is configured to prevent the hydronic fluid from returning to the boiler below a predetermined temperature.

8. The stand-alone, wet rotor circulator for the hydronic system of claim 1, wherein the recirculating hydronic fluid system is connected to a cooling system comprising liquid flow ducts for chilled liquid, wherein air is blown past the liquid flow ducts in the recirculating hydronic fluid system containing chilled liquid, and further comprising an air supply heat sensor monitoring the temperature of the air that has blown past the ducts in the recirculating hydronic fluid system containing the chilled liquid.

* * * * *